US012437124B2

(12) United States Patent
Pareek et al.

(10) Patent No.: US 12,437,124 B2
(45) Date of Patent: Oct. 7, 2025

(54) METHOD AND ELECTRONIC DEVICE FOR SECURING DISPLAY OF CONFIDENTIAL CONTENT

(71) Applicant: SAMSUNG ELECTRONICS CO., LTD., Suwon-si (KR)

(72) Inventors: Saurabh Pareek, Uttar Pradesh (IN); Abhishek Kumar Singh, Uttar Pradesh (IN); Udish Nagpal, Uttar Pradesh (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 17/940,846

(22) Filed: Sep. 8, 2022

(65) Prior Publication Data

US 2023/0025191 A1  Jan. 26, 2023
US 2025/0068778 A9  Feb. 27, 2025

Related U.S. Application Data

(63) Continuation of application No. PCT/KR2022/009911, filed on Jul. 8, 2022.

(30) Foreign Application Priority Data

Jul. 12, 2021 (IN) .............................. 202141031302

(51) Int. Cl.
G06F 21/84 (2013.01)
G06F 21/62 (2013.01)

(52) U.S. Cl.
CPC .......... G06F 21/84 (2013.01); G06F 21/6245 (2013.01)

(58) Field of Classification Search
CPC .............................. G06F 21/6245; G06F 21/84
(Continued)

(56) References Cited

U.S. PATENT DOCUMENTS 9,411,415 B2  8/2016  Jeong et al.
9,727,741 B2  8/2017  Bostick et al.
(Continued)

FOREIGN PATENT DOCUMENTS

CN  109241775 A  1/2019
JP  4288428  4/2009
(Continued)

OTHER PUBLICATIONS

PCT International Search Report dated Oct. 28, 2022 for PCT/KR2022/009911.
(Continued)

*Primary Examiner* — David P Zarka
(74) *Attorney, Agent, or Firm* — NIXON & VANDERHYE P.C.

(57) ABSTRACT

A method and/or system for securing display of confidential content by an electronic device. The method may include displaying content on a screen of the electronic device. The method may include detecting an event to initiate a secure mode in the electronic device. The method may include determining confidential portions and non-confidential portions of the content displayed on the screen of the electronic device based on a view priority score and a confidentiality score, and determining a viewing angle of a user of the electronic device and a viewing distance of the user of the electronic device. The method may include displaying the confidential portions of the content based on the viewing angle of the user of the electronic device and the viewing distance of the user of the electronic device.

17 Claims, 15 Drawing Sheets

(58) Field of Classification Search
USPC .......................................................... 726/26
See application file for complete search history.

(56) References Cited

U.S. PATENT DOCUMENTS

| | | | |
|---|---|---|---|
| 10,416,720 B2 | 9/2019 | Lee et al. | |
| 10,423,193 B2 | 9/2019 | Kim et al. | |
| 11,361,114 B2* | 6/2022 | Hsieh | G06F 1/1618 |
| 2008/0225131 A1 | 9/2008 | Aoki | |
| 2009/0044254 A1* | 2/2009 | Tian | G06Q 30/02 |
| | | | 726/4 |
| 2009/0141895 A1* | 6/2009 | Anderson | G06F 21/84 |
| | | | 380/252 |
| 2010/0205667 A1* | 8/2010 | Anderson | G06F 3/013 |
| | | | 726/19 |
| 2010/0321275 A1* | 12/2010 | Hinckley | G06F 1/1618 |
| | | | 345/1.3 |
| 2011/0081889 A1 | 4/2011 | Gao et al. | |
| 2011/0143769 A1* | 6/2011 | Jones | H04M 1/7246 |
| | | | 455/566 |
| 2011/0206285 A1* | 8/2011 | Hodge | G06F 21/84 |
| | | | 382/224 |
| 2012/0306910 A1 | 12/2012 | Kim et al. | |
| 2013/0050265 A1* | 2/2013 | de Paz | G06F 1/1641 |
| | | | 345/649 |
| 2013/0265221 A1* | 10/2013 | Lee | H04N 21/4222 |
| | | | 345/156 |
| 2014/0168070 A1* | 6/2014 | Jeong | G09G 3/035 |
| | | | 345/156 |
| 2015/0150140 A1* | 5/2015 | Biswas | G06F 1/1652 |
| | | | 726/26 |
| 2016/0132721 A1* | 5/2016 | Bostick | G06F 3/013 |
| | | | 382/118 |
| 2016/0210473 A1* | 7/2016 | Cohen | G06F 21/60 |
| 2017/0140224 A1 | 5/2017 | Wilson et al. | |
| 2019/0012000 A1* | 1/2019 | Cavallaro | G06F 1/1626 |
| 2019/0129601 A1 | 5/2019 | Bae et al. | |
| 2019/0180664 A1 | 6/2019 | Sun et al. | |
| 2019/0285904 A1 | 9/2019 | Kim et al. | |
| 2020/0257819 A1 | 8/2020 | Lee et al. | |
| 2021/0073420 A1 | 3/2021 | Ramadhane et al. | |
| 2021/0089686 A1* | 3/2021 | He | G06F 1/1641 |
| 2022/0011607 A1* | 1/2022 | Hsieh | G02F 1/1347 |
| 2022/0075854 A1* | 3/2022 | Chhabra | G06F 21/84 |

FOREIGN PATENT DOCUMENTS

| | | |
|---|---|---|
| KR | 10-2014-0095246 | 8/2014 |
| KR | 10-2015-0141083 A | 12/2015 |
| WO | WO 2020/002768 A1 | 1/2020 |
| WO | WO 2020/204908 A1 | 10/2020 |

OTHER PUBLICATIONS

PCT Written Opinion dated Oct. 28, 2022 for PCT/KR2022/009911.
India Examination Report dated Mar. 7, 2023 for IN Application No. 202141031302.

* cited by examiner

METHOD AND ELECTRONIC DEVICE FOR SECURING DISPLAY OF CONFIDENTIAL CONTENT

CROSS-REFERENCE TO RELATED APPLICATIONS

This application is a continuation of International Application No. PCT/KR2022/009911, designating the United States, filed on Jul. 8, 2022, in the Korean Intellectual Property Receiving Office and claiming priority to IN Patent Application No. 202141031302, filed on Jul. 12, 2021, the disclosures of which are incorporated by reference herein in their entireties.

BACKGROUND

Field

The present disclosure relates to an electronic device, and for example more specifically related to a method and the electronic device for securing a display of confidential content.

Description of Related Art

When a user using or carrying a smartphone or tablet in a public place, whether outdoors, at a cafe (1), a restaurant, or work (2). There are a variety of concerns if a user does not take caution. For example, if the user uses an unsecured or fraudulent wireless network, someone can obtain access to the user's internet activities or open application, and anyone can access the user's smartphone over Bluetooth to send unwelcome Short Message Service (SMS), exploit user's contacts list, or gain access to user's handset's instructions. In another case, the user may be subjected to shoulder surfing/visual hacking in a public place where others may see your screen. Be mindful of who is in the user's immediate vicinity and who could be observing what they do online. It may seem innocuous, but considering how many of user do practically everything on the smartphone, it is worth considering. Using the smartphone for everything has become second nature, from social networking to online banking. However, if the user signing into accounts or reviewing sensitive information in the smartphone, others may be able to view everything (e.g. password, contact numbered, etc.), while you unknowingly type away. Almost all appreciate their phones' large, bright, attractive displays, but they aren't excellent for protecting privacy of the user.

To avoid the visual hacking, an existing electronic device(s) employs privacy screen protectors; the user must purchase the privacy screen protectors separately and place them on the existing electronic device's screen. A majority of privacy screen protectors employ micro louver technology, which enables light from the display to flow through only at specific angles. It's similar to how Venetian window blinds function, although on a much smaller scale. A filter layer is set on a screen of the electronic device to a restricted front angle, often 60 or 90 degrees, and anyone looking at the screen from outside of that viewing angle would see nothing. On paper, privacy screen protectors sound fantastic.

Unfortunately, the truth is a little different. Many manufacturers claim that there will be no problems with clarity or brightness of the screen of the electronic device, but this is not always the case. The user can solve the problem by increasing brightness of the screen, however, this may cause a battery of the electronic device to drain quicker.

Furthermore, some of the existing electronic device(s) (10) uses a reflective property. At 4, when a first flip cover is inclined to a display panel and a second flip cover is located on opposite side of a cover member, a stereoscopic image device (e.g., the protective cover of the electronic device) is capable of forming an aerial image in a space outside the first flip cover. The existing electronic device(s) (10) have attractive displays, but they aren't excellent for protecting the privacy of the user. Thus, it is desired to at least provide a useful alternative for securing the display of confidential content by a proposed method/electronic device.

SUMMARY

An example object of certain example embodiments herein is to provide a secured environment for user content such that the user content may only be viewed by a user of an electronic device in a public place, or be less likely to be viewed by anyone other than the user. Any other person who is nearby to the user's electronic device will be unable to see the user content, or the user content will seem distorted to them on the electronic device's screen. A secured environment/mode is triggered in the electronic device when the user folds the electronic device and/or perform certain action on the electronic device.

An example object of certain example embodiments herein is to determine a view priority of each view displayed on the electronic device's screen when the secured environment/mode is triggered. In the secure mode, the electronic device intelligently changes a display property (e.g. enhance color/change color) dynamically, and enhances a reflection property for each view displayed on the screen of the electronic device based on the view priority.

An example object of certain example embodiments herein is to determine a confidentiality score of each content (e.g. image, text, button, etc.) displayed on the screen when the secured environment/mode is triggered. The electronic device uses the confidentiality score to identify confidential portions and non-confidential portions of each content displayed on the screen of the electronic device. Then, the electronic device intelligently splits and intelligently places the confidential portions and non-confidential portions on the screen of the electronic device based on a viewing angle of the user and/or a folding angle and/or using a Machine Learning (ML) model, such a way that only the user of the electronic device can see the identified confidential portions and non-confidential portions on the screen of the electronic device.

Accordingly, certain example embodiments herein disclose a method for securing a display of confidential content by an electronic device. The method may include displaying, by the electronic device, content on a screen of the electronic device. Further, the method may include detecting, by the electronic device, an event to initiate a secure mode in the electronic device, wherein the event includes a folding of the electronic device and a user input on the electronic device. Further, the method may include initiating, by the electronic device, the secure mode for the electronic device based on the detected event. Further, the method may include determining, by the electronic device, confidential portions and non-confidential portions of the content displayed on the screen of the electronic device. Further, the method includes determining, by the electronic device, a viewing angle of a user of the electronic device and a viewing distance of the user of the electronic device. Further, the method may include displaying, by the electronic device, the confidential portions of the content based on the viewing angle of the user of the electronic device and the viewing distance of the user of the electronic device. In an example embodiment, where the secure mode is initiated by the folding of the electronic device includes determining, by the electronic device, whether a folding angle meets a folding threshold. Further, the method may include initiating, by the electronic device, the secure mode in the electronic device in response to determining that the folding angle meets the folding threshold. In an example embodiment, where the secure mode is initiated through the user input on the electronic device by gesture action performed on the electronic device and by clicking on a quick panel of the electronic device.

In an example embodiment, where the folding angle of the electronic device is determined by receiving, by the electronic device, data from a plurality of sensors of the electronic device; and determining, by the electronic device, the folding angle of the electronic device based on the received data.

In an example embodiment, where the data includes directional movement of the electronic device, orientation or tilt during the directional movement of the electronic device, magnetic data of the electronic device, and vibrational data of the electronic device, and where the plurality of sensors of the electronic device includes a gyroscope sensor, an accelerometer sensor, a magnetometer sensor, and a vibration sensor.

In an example embodiment, where determining, by the electronic device, the confidential portions and the non-confidential portions of the content displayed on the screen of the electronic device includes determining, by the electronic device, a view priority score of each content displayed on the screen of the electronic device when the secure mode is initiated. Further, the method includes automatically modifying, by the electronic device, a display characteristic of each content displayed on the screen of the electronic device based on the view priority score. Further, the method includes determining, by the electronic device, a confidentiality score of each content displayed on the screen of the electronic device, where the confidentiality score of each content identifies the confidential portions and the non-confidential portions of the content displayed on the screen of the electronic device.

In an example embodiment, where automatically modifying, by the electronic device, the display characteristic of each content displayed on the screen of the electronic device based on the view priority score includes assigning, by the electronic device, the view priority score to each content displayed on the screen of the electronic device based on a view z-order, a view size, and a size of the electronic device, where each content includes a surface view, a text view, a video view, an image view, a button, and a checkbox. Further, the method may include configuring, by the electronic device, a color intensity of each content displayed on the screen of the electronic device based on the assigned view priority score, where the assigned view priority score includes a high priority score has a greater reflective characteristic and a low priority score has a lesser reflective characteristic.

In an example embodiment, where determining, by the electronic device, the confidentiality score of each content displayed on the screen of the electronic device includes extracting, by the electronic device, a plurality of objects from the displayed content, where the plurality of objects comprise an image object, a text object, and a button object. Further, the method includes generating, by the electronic device, an array of each object of the plurality of objects. Further, the method may include resizing, by the electronic device, each object of the plurality of objects and layout of the screen by passing the generated array into a framework of the electronic device. Further, the method includes determining, by the electronic device, at least one actionable item from the plurality of objects, where the actionable item includes a clickable button and a nonclickable button. Further, the method may include generating, by the electronic device, the confidentiality score of each content displayed on the screen of the electronic device by applying at least one Machine Learning (ML) model on the at least one actionable item, the resized each object, the resized layout and configured color intensity. Further, the method may include classifying, by the electronic device, each content based on the confidentiality score to identify the confidential portions and the non-confidential portions of the content displayed on the screen of the electronic device.

In an example embodiment, where the array includes an object Identity (ID), a location of the object on the screen of the electronic device, a size of the object, an alignment of the object on the screen of the electronic device, and a position of the object on the screen of the electronic device.

In an example embodiment, where each object and the layout is resized based on reflection points, reflection area, the folding angle, the viewing angle of the user of electronic device, and an angle of reflection.

In an example embodiment, where displaying, by the electronic device, the confidential portions of the content based on the viewing angle of the user of the electronic device and the viewing distance of the user of the electronic device includes automatically splitting, by the electronic device, the confidential portions and the non-confidential portions of the content displayed on the screen of the electronic device based on the confidentiality score in order to display the confidential portions and the non-confidential portions of the content at an optimal place on the screen of the electronic device.

In an example embodiment, where automatically splitting, by the electronic device, the confidential portions and the non-confidential portions of the content displayed on the screen of the electronic device in order to place the confidential portions and the non-confidential portions of the content at the optimal place on the screen of the electronic device includes splitting, by the electronic device, the confidential portions and the non-confidential portions of the content displayed on the screen of the electronic device. Further, the method may include modifying, by the electronic device, the confidential portions of the content displayed on the screen of the electronic device by performing at least one action. Further, the method may include placing, by the electronic device, the confidential portions of the content displayed on the screen of the electronic device based on the folding angle, the viewing distance of the user of the electronic device, the viewing angle of the user of the electronic device, the angle of reflection, reflection points and reflection area.

In an example embodiment, where the viewing distance of the user of the electronic device is determined by capturing, by a front camera of the electronic device, an image on the screen of the electronic device, where the image includes a face of the user of the electronic device is generated on the screen of the electronic device by a reflective characteristic and the displayed content on the screen of the electronic device. Further, the method may include extracting, by the electronic device, the face of the user of the electronic device by removing the displayed content from the captured image. Further, the method may include determining, by the electronic device, a first dimension of the extracted face of the user of the electronic device using the front camera of the electronic device and a second dimension of the extracted face of the user of the electronic device formed on the screen of the electronic device by the reflective characteristic. Further, the method may include determining, by the electronic device, a first distance between the extracted face of the user of the electronic device formed on the screen of the electronic device and the front camera of the electronic device. Further, the method may include determining, by the electronic device, the distance of the user of the electronic device from the electronic device based on the first dimension, the second dimension, and the first distance.

In an example embodiment, where the viewing angle of the user of the electronic device and the angle of reflection is determined by determining, by the electronic device, the viewing angle, and the angle of reflection based on the folding angle, a dimension of the electronic device, and the second dimension of the extracted face of the user of the electronic device.

In an example embodiment, where the reflection points and the reflection area are identified based on the folding angle, the viewing distance of the user of the electronic device, the viewing angle of the user of the electronic device, the angle of reflection.

Accordingly, certain example embodiments herein provide the electronic device for securing the display of confidential content by an electronic device. The electronic device may include a content controller coupled with a processor and a memory. The content controller may be configured to display the content on the screen of the electronic device. Further, the content controller may be configured to detect the event to initiate the secure mode in the electronic device, where the event includes one of the folding of the electronic device and the user input on the electronic device. Further, the content controller may be configured to initiate the secure mode for the electronic device based on the detected event. Further, the content controller may be configured to determine the confidential portions and the non-confidential portions of the content displayed on the screen of the electronic device. Further, the content controller may be configured to determine the viewing angle of the user of the electronic device and the viewing distance of the user of the electronic device. Further, the content controller may be configured to display the confidential portions of the content based on one of the viewing angle of the user of the electronic device and the viewing distance of the user of the electronic device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The above and other aspects, features and advantages of certain an example embodiment will be more apparent from the following detailed description, taken in conjunction with the accompanying drawings, in which.

DETAILED DESCRIPTION

Figure 1:
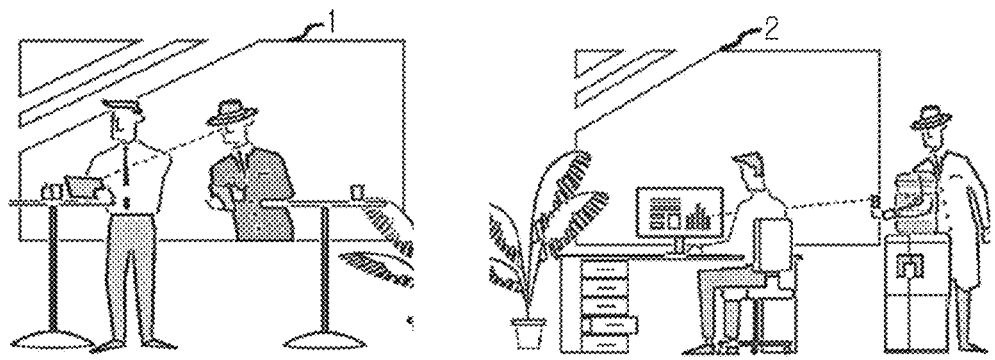
FIG. 1 illustrates few examples of visual hacking on an existing electronic device(s), according to a prior art disclosed herein.
Figure 1:
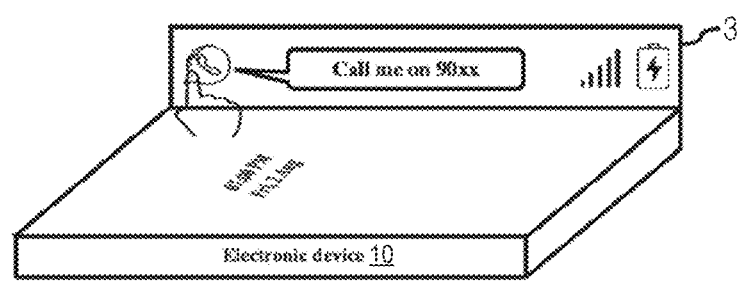
Figure 1:
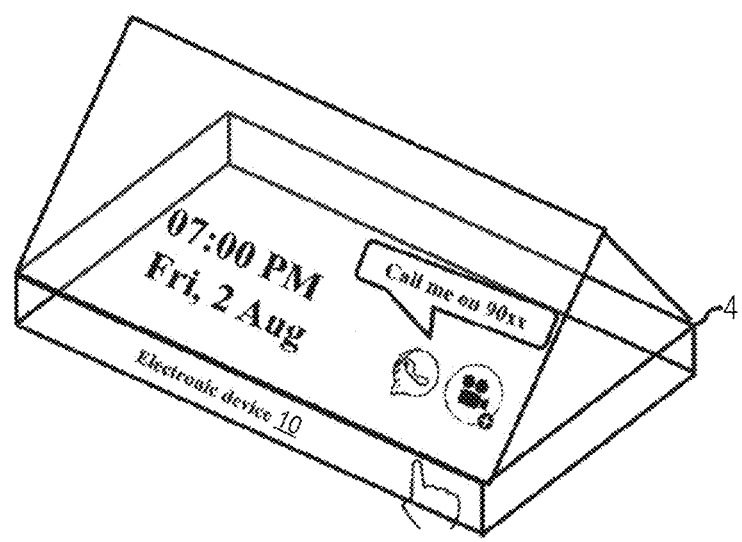

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. Each processor herein, and each controller herein, comprises circuitry. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "foldable electronic device" and "electronic device" are used interchangeably and mean the same. The terms "non-foldable electronic device" and "electronic device" are used interchangeably and mean the same. Throughout this disclosure, the terms "upper fold", "upper screen" and "first screen" are used interchangeably and mean the same. Throughout this disclosure, the terms "lower fold", "lower screen" and "second screen" are used interchangeably and mean the same.

Accordingly, embodiments herein disclose a method for securing display of confidential content by an electronic device. The method includes displaying, by the electronic device, content on a screen of the electronic device. Further, the method includes detecting, by the electronic device, at least one event to initiate a secure mode in the electronic device, where the event includes a folding of the electronic device and a user input on the electronic device. Further, the method includes initiating, by the electronic device, the secure mode for the electronic device based on the detected event. Further, the method includes determining, by the electronic device, confidential portions and non-confidential portions of the content displayed on the screen of the electronic device. Further, the method includes determining, by the electronic device, a viewing angle of the user of the electronic device and a viewing distance of the user of the electronic device. Further, the method includes displaying, by the electronic device, the confidential portions of the content based on the viewing angle of the user of the electronic device and the viewing distance of the user of the electronic device.

Accordingly, the embodiments herein provide the electronic device for securing the display of confidential content by an electronic device. The electronic device includes a content controller coupled with a processor and a memory. The content controller is configured to display the content on the screen of the electronic device. Further, the content controller is configured to detect the event to initiate the secure mode in the electronic device, where the event includes one of the folding of the electronic device and the user input on the electronic device. Further, the content controller is configured to initiate the secure mode for the electronic device based on the detected event. Further, the content controller, comprising circuitry, is configured to determine the confidential portions and the non-confidential portions of the content displayed on the screen of the electronic device. Further, the content controller is configured to determine the viewing angle of the user of the electronic device and the viewing distance of the user of the electronic device. Further, the content controller is configured to display the confidential portions of the content based on one of the viewing angle of the user of the electronic device and the viewing distance of the user of the electronic device Each embodiment herein may be used in combination with any other embodiment(s) herein.

Unlike existing methods and systems, the proposed method allows the electronic device to provide a secured environment for user content such that the user content may only be viewed by a user of an electronic device in a public place. Any other person who is nearby to the user's electronic device will be unable to see the user content, or the user content will seem distorted to them on the electronic device's screen. A secured environment/mode is triggered in the electronic device when the user folds the electronic device and/or perform certain action on the electronic device.

Unlike existing methods and systems, the proposed method allows the electronic device to determine a view priority of each view displayed on the electronic device's screen when the secured environment/mode is triggered. In the secure mode, the electronic device intelligently changes a display property (e.g. enhance color/change color) dynamically, and enhances a reflection property for each view displayed on the screen of the electronic device based on the view priority.

Unlike existing methods and systems, the proposed method allows the electronic device to determine a confidentiality score of each content (e.g. image, text, button, etc.) displayed on the screen when the secured environment/mode is triggered. The electronic device uses the confidentiality score to identify confidential portions and non-confidential portions of each content displayed on the screen of the electronic device. Then, the electronic device intelligently splits and intelligently places the confidential portions and nonconfidential portions on the screen of the electronic device based on a viewing angle of the user and/or a folding angle and/or using a Machine Learning (ML) model, such a way that only the user of the electronic device can see the identified confidential portions and non-confidential portions on the screen of the electronic device.

Referring now to the drawings, and more particularly to FIGS. 2 through 9, where similar reference characters denote corresponding features consistently throughout the figures, there are shown preferred embodiments.

Figure 2:
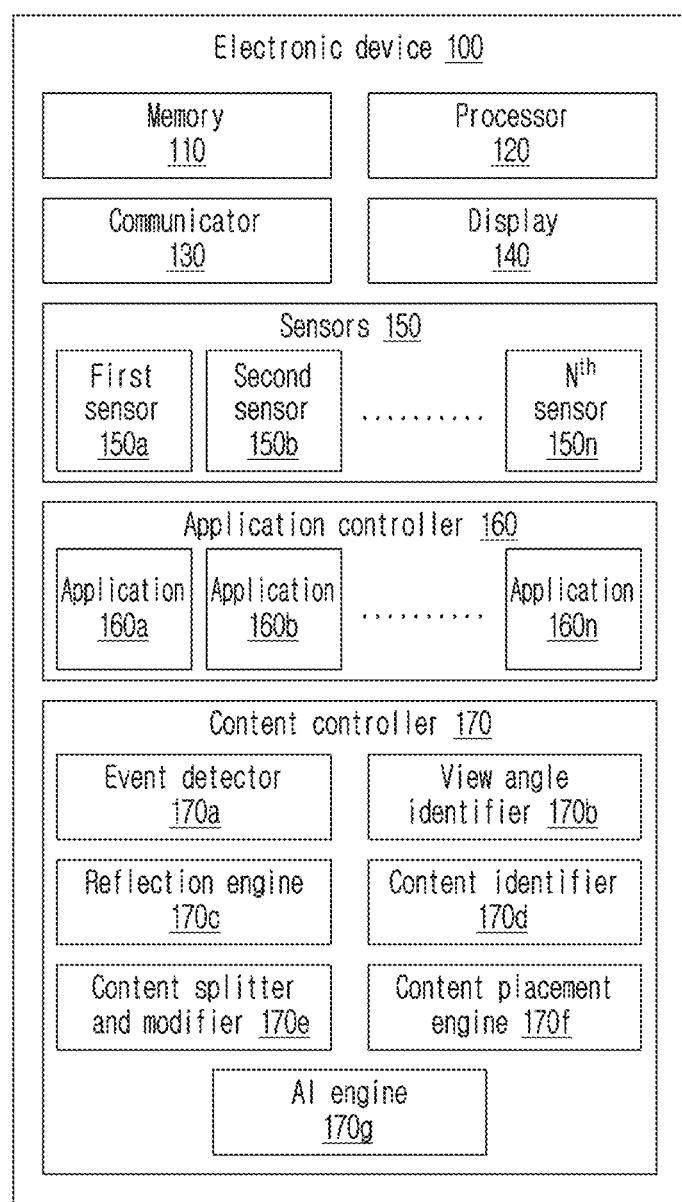
FIG. 2 illustrates a block diagram of an electronic device for securing display of confidential content based on a view priority and a confidentiality score, according to an example embodiment.

FIG. 2 illustrates a block diagram of an electronic device (100) for securing display of confidential content based on a view priority and a confidentiality score, according to an example embodiment. The electronic device (100) can be, for example, but not limited to a smartphone, a tablet, a laptop, an internet of things (IoT) device, a User Equipment (UE), a wearable device, or alike.

In an embodiment, the electronic device (100) includes a memory (110), a processor (120), a communicator (130), a display (140) (e.g. screen (140) of the electronic device (100)), a sensor(s) (150), an application controller (160) and a content controller (170). Each processor herein, and each controller herein, comprises circuitry.

The memory (110) stores the confidential portions and nonconfidential portions of the content displayed on the display screen (140) of the electronic device (100), a viewing angle of the user of the electronic device (100) and a viewing distance of the user of the electronic device (100), a folding threshold, data from a plurality of sensors (150) of the electronic device (100), a view priority score of each content displayed on the screen (140) of the electronic device (100) when a secure mode is initiated, and a confidentiality score of each content displayed on the screen (140) of the electronic device (100).

Further, the memory (110) also stores instructions to be executed by the processor (120) which includes processing circuitry. The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information. In certain examples, a non-transitory storage medium may store data that can, over time, change (e.g., in Random Access Memory (RAM) or cache). The memory (110) can be an internal storage unit or it can be an external storage unit of the electronic device (100), a cloud storage, or any other type of external storage.

The processor (120) communicates with the memory (110), the communicator (130), the display (140), the sensor(s) (150), the application controller (160), and the content controller (170) which includes circuitry. The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) includes an electronic circuit specific to a standard that enables wired or wireless communication. The communicator (130) is configured for communicating internally between internal hardware components and with external devices via one or more networks. The display (140) is configured to display the application on a screen (140) of the electronic device (100). The sensor(s) (150 or 150a-150n) can be, for example, but not limited to an image sensor (front camera of the electronic device (100)), a gyroscope sensor, an accelerometer sensor, a magnetometer sensor, and a vibration sensor.

The application controller (160) is configured to control a plurality of applications (160a-160n) of each application of the electronic device (100). Examples for the application are, but not limited to a media application, a web application, a video player application, a camera application, a game application, a business application, an education application, a lifestyle application, an entertainment application, a utility application, a travel application, etc.

In an embodiment, the content controller (170) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

In an embodiment, the content controller (170) includes an event detector (170a), a view angle identifier (170b), a reflection engine (170c), a content identifier (170d), a content splitter and modifier (170e), a content placement engine (170f) and an AI engine (170g).

In an embodiment, the event detector (170a) detects an event to initiate a secure mode (e.g. only the user of the electronic device (100) sees confidential and non-confidential data on the screen (140) of the electronic device (100). Other users or those attempting to view the screen (140) of the electronic device (100) from a different angle/view see only non-confidential data on the screen (140) of the electronic device (100)) in the electronic device (100), where the event includes a folding of the electronic device (100) and a user input on the electronic device (100). Furthermore, the event detector (170a) determines whether a folding angle meets a folding threshold. Furthermore, the event detector (170a) initiates the secure mode in the electronic device (100) in response to determining that the folding angle meets the folding threshold.

Furthermore, the event detector (170a) receives data from the plurality of sensors (150) of the electronic device (100). Furthermore, the event detector (170a) determines the folding angle of the electronic device (100) based on the received data. The data includes a directional movement of the electronic device (100), an orientation or a tilt during the directional movement of the electronic device (100), magnetic data of the electronic device (100), and vibrational data of the electronic device (100), and where the plurality of sensors (150) of the electronic device (100) includes a gyroscope sensor, an accelerometer sensor, a magnetometer sensor, and a vibration sensor. Furthermore, the event detector (170a) initiates the secure mode in response to receiving the user input on the electronic device (100) such as a gesture action performed on the electronic device (100), a click on a quick panel of the electronic device (100).

In an embodiment, the view angle identifier (170b) captures an image on the screen (140) of the electronic device (100), where the image including a face of the user of the electronic device (100) is generated on the screen (140) of the electronic device (100) by a reflective characteristic and the displayed content on the screen (140) of the electronic device (100). Furthermore, the view angle identifier (170b) extracts the face of the user of the electronic device (100) by removing the displayed content from the captured image. Furthermore, the view angle identifier (170b) determines a first dimension of the extracted face of the user of the electronic device (100) using the front camera of the electronic device (100) and a second dimension of the extracted face of the user of the electronic device (100) formed on the screen (140) of the electronic device (100) by the reflective characteristic.

Furthermore, the view angle identifier (170b) determines a first distance between the extracted face of the user of the electronic device (100) formed on the screen (140) of the electronic device (100) and the front camera of the electronic device (100). Furthermore, the view angle identifier (170b) determines the distance of the user of the electronic device (100) from the electronic device (100) based on the first dimension, the second dimension, and the first distance.

In an embodiment, the view angle identifier (170b) determines the angle between the user and the electronic device (100) and an angle of reflection based on the folding angle, a dimension of the electronic device (100), and the second dimension of the extracted face of the user of the electronic device (100).

In an embodiment, the reflection engine (170c) determines reflection points and a reflection area is identified based on the folding angle, the viewing distance of the user of the electronic device (100), the viewing angle of the user of the electronic device (100), and the angle of reflection.

In an embodiment, the content identifier (170d) determines a view priority score of each content displayed on the screen (140) of the electronic device (100) when the secure mode is initiated. Furthermore, the content identifier (170d) assigns the view priority score to each content displayed on the screen (140) of the electronic device (100) based on a view z-order, a view size, and a size of the electronic device (100), where each content includes a surface view, a text view, a video view, an image view, a button, and a checkbox. Furthermore, the content identifier (170d) configures the color intensity of each content displayed on the screen (140) of the electronic device (100) based on the assigned view priority score, where the assigned view priority score includes a high priority score with a greater reflective characteristic and a low priority score with a lesser reflective characteristic.

In an embodiment, the content splitter and modifier (170e) extracts a plurality of objects from the displayed content, where the plurality of objects comprise an image object, a text object, and a button object. Furthermore, the content splitter and modifier (170e) generates an array of each object of the plurality of objects. Furthermore, the content splitter and modifier (170e) resizes each object of the plurality of objects and layout of the screen (140) by passing the generated array into a framework of the electronic device (100). Furthermore, the content splitter and modifier (170e) determines at least one actionable item from the plurality of objects, where the actionable item includes a clickable button and a nonclickable button.

Furthermore, the content splitter and modifier (170e) generates the confidentiality score of each content displayed on the screen (140) of the electronic device (100) by applying at least one ML model on the actionable item, the resized each object, the resized layout and configured color intensity. Furthermore, the content splitter and modifier (170e) classifies each content based on the confidentiality score to identify the confidential portions and the non-confidential portions of the content displayed on the screen (140) of the electronic device (100). The array includes an object ID, a location of the object on the screen (140) of the electronic device (100), a size of the object, an alignment of the object on the screen (140) of the electronic device (100), and a position of the object on the screen (140) of the electronic device (100). Furthermore, each object and the layout is resized based on the reflection points, the reflection area, the folding angle, the viewing angle of the user of the electronic device (100), and the angle of reflection.

Furthermore, the content splitter and modifier (170e) splits the confidential portions and the non-confidential portions of the content displayed on the screen (140) of the electronic device (100). Furthermore, the content splitter and modifier (170e) modifies the confidential portions of the content displayed on the screen (140) of the electronic device (100) by performing at least one action, examples of the action are explained in FIG. 8A-8D.

In an embodiment, the content placement engine (170f) places the confidential portions of the content displayed on the screen (140) of the electronic device (100) based on the folding angle, the viewing distance of the user of the electronic device (100), the viewing angle of the user of the electronic device (100), the angle of reflection, the reflection points and the reflection area.

At least one of the plurality of modules/components, as mentioned above, maybe implemented through the AI engine (170g). A function associated with the AI engine (170g) may be performed through memory (110) and the processor (120). One or a plurality of processors controls the processing of the input data in accordance with a predefined operating rule or the AI engine (170g) stored in the non-volatile memory and the volatile memory. The predefined operating rule or artificial intelligence model is provided through training or learning.

Here, being provided through learning means that, by applying a learning process to a plurality of learning data, a predefined operating rule or the AI engine (170g) of the desired characteristic is made. The learning may be performed in the electronic device (100) itself in which AI according to an embodiment is performed, and/or maybe implemented through a separate server/system.

The AI engine (170g) may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although FIG. 2 shows various hardware components of the electronic device (100), it is to be understood that other embodiments are not limited thereon. In other embodiments, the electronic device (100) may include less or more components. Further, the labels or names of the components are used only for illustrative purpose and do not limit the scope of the invention. One or more components can be combined together to perform the same or substantially similar function to secure display of the confidential content.

Figure 3:
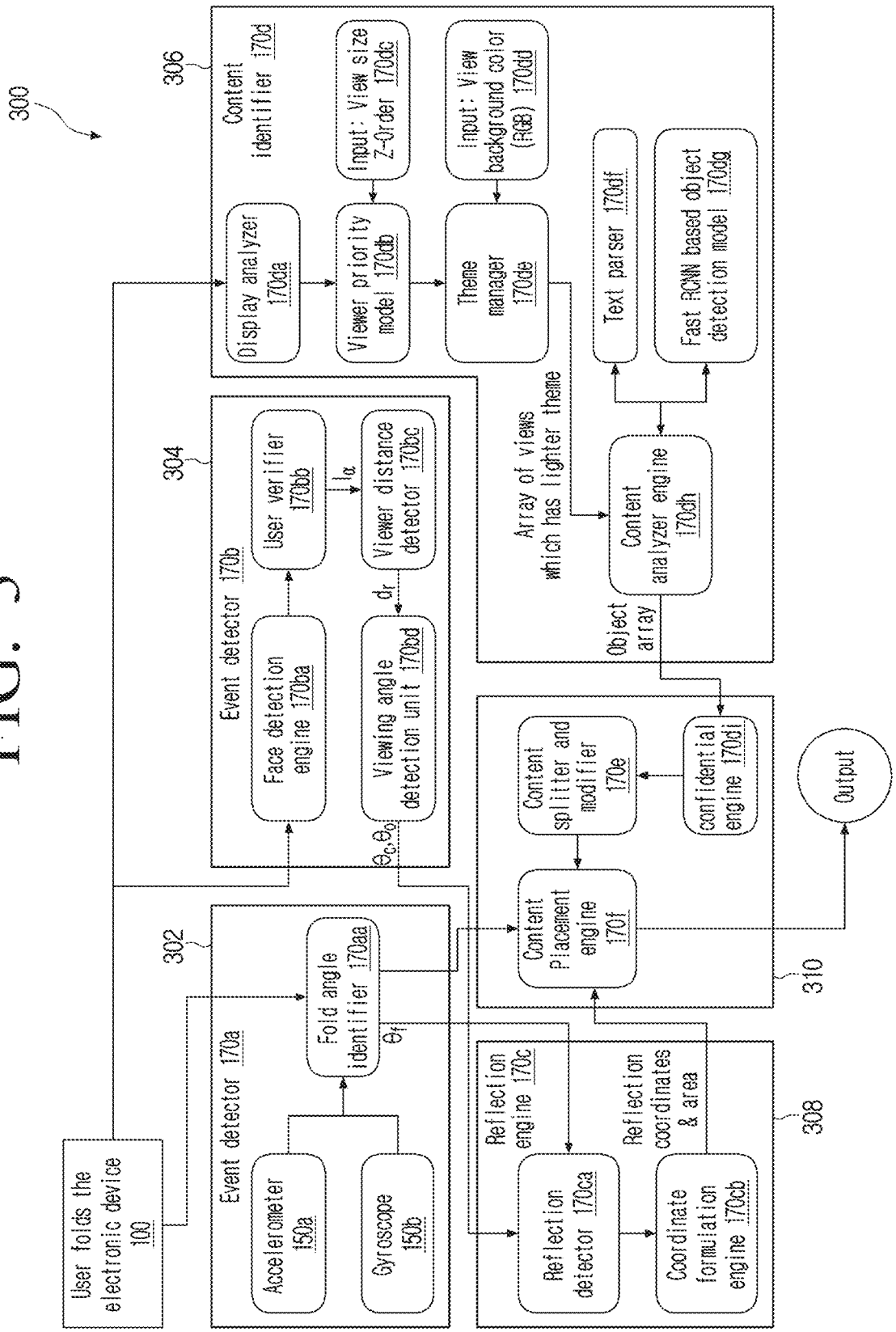
FIG. 3 is a flow diagram illustrating a method for securing display of the confidential content based on the view priority and the confidentiality score, according to an example embodiment.

FIG. 3 is a flow diagram (300) illustrating a method for securing the display of confidential content based on the view priority and the confidentiality score, according to an example embodiment.

At 302, a fold angle identifier (170aa) receives the data from a plurality of sensors (150) of the electronic device (100), an example of the plurality of sensors (150), the accelerometer sensor (150a) and the gyroscope sensor (150b), when the user of the electronic device (100) folds the electronic device (100). The fold angle identifier (170aa), which may be part of event detector 170a, then determines the folding angle (0f) of the electronic device (100) based on the received data. The fold angle identifier (170aa) then sends the folding angle (0f) of the electronic device (100) to the content placement engine (170f) and a reflection detector (170ca) of the reflection engine (170c).

At 304, a face detector engine (170ba) of the view angle identifier (170b) captures the image on the screen (140) of the electronic device (100). The image including the face of the user of the electronic device (100) is generated on the screen (140) of the electronic device (100) by a reflective characteristic and the displayed content on the screen (140) of the electronic device (100). Then, a user verifier (170bb) of the view angle identifier (170b) extracts the face (Ia) of the user of the electronic device (100) by removing the displayed content from the captured image and verifies the extracted face of the user of the electronic device (100) (Ia).

Furthermore, a viewer distance detector (170bc) of the view angle identifier (170b) determines the first dimension of the extracted face of the user of the electronic device (100) using the front camera of the electronic device (100) and the second dimension of the extracted face of the user of the electronic device (100) formed on the screen (140) of the electronic device (100) by the reflective characteristic. The viewer distance detector (170bc) then determines the first distance between the extracted face of the user of the electronic device (100) formed on the screen (140) of the electronic device (100) and the front camera of the electronic device (100). The viewer distance detector (170bc) then determines a distance (dr) of the user of the electronic device (100) from the electronic device (100) based on the first dimension, the second dimension, and the first distance.

Furthermore, a viewing angle detection unit (170bd) of the view angle identifier (170b), including circuitry, determines the viewing angle ($\theta_o$) of the user of the electronic device (100) and the angle of reflection ($\theta e$) based on the folding angle, a dimension of the electronic device (100), and the second dimension of the extracted face of the user of the electronic device (100). Furthermore, the viewing angle detection unit (170bd) sends the viewing angle ($\theta_o$) and the viewing angle ($\theta_o$) to the reflection detector (170ca). Each "unit" described herein may comprise corresponding circuitry.

At 306, a display analyzer (170da) of the content identifier (170d) analyzes the content on the screen (140) of the electronic device (100), when the user of the electronic device (100) folds the electronic device (100). Then, a viewer priority model (170db) of the content identifier (170d) determines the view priority score of each content displayed on the screen (140) of the electronic device (100) when the secure mode is initiated, where the view priority model (170db) takes input from a view size z-order (170dc). Then, a theme manager (170e) of the content identifier (170d) modifies the display characteristic of each content displayed on the screen (140) of the electronic device (100) based on the view priority score, where the theme manager (170e) takes input from a view background color (170d).

Furthermore, the theme manager (170de) configures the color intensity of each content displayed on the screen (140) of the electronic device (100) based on the assigned view priority score. Furthermore, the theme manager (170de) extracts the plurality of objects from the displayed content and generates the array of each object of the plurality of objects. Furthermore, the theme manager (170de) sends the array of each object of the plurality of objects to a content analyzer engine (170dh) of the content identifier (170d). The content analyzer engine (170dh) resizes each object of the plurality of objects and a layout of the screen (140) by passing the generated array into the framework of the electronic device (100) and determines the actionable item from the plurality of objects, where the content analyzer engine (170dh) takes input from a text parser (170df) and a fast Region Based Convolutional Neural Networks (RCNN) based object detection model (170dg). Furthermore, the content analyzer engine (170dh) sends a modified array to a confidential engine (170di) of the content identifier (170d).

At 308, the reflection detector (170ca) and a coordinate formulation engine (170cb) of the reflection engine (170c) determine the reflection points and the reflection area are identified based on the folding angle, the viewing distance of the user of the electronic device (100), the viewing angle of the user of the electronic device (100), and the angle of reflection. Furthermore, the coordinate formulation engine (170cb) passes the reflection points and the reflection area to the content placement engine (170f).

At 310, a confidential engine (170di) determines the confidentiality score of each content displayed on the screen (140) of the electronic device (100) at least by applying the ML model on the actionable item, the resized each object, the resized layout and configured color intensity and forward the confidentiality score of each content to the content splitter and modifier (170e). The content splitter and modifier (170e) automatically splits and modifies the confidential portions and the non-confidential portions of the content displayed on the screen (140) of the electronic device (100) based on the confidentiality score.

The content placement engine (170f) places the confidential portions of the content displayed on the screen (140) of the electronic device (100) based on the folding angle, the viewing distance of the user of the electronic device (100), the viewing angle of the user of the electronic device (100), the angle of reflection, the reflection points and the reflection area. Furthermore, the detailed explanation of 302-310 is given in FIG. 4 to FIG. 9.

The various actions, acts, blocks, steps, or the like in the flow diagram (300) may be performed in the order presented, in a different order or simultaneously. Further, in some embodiments, some of the actions, acts, blocks, steps, or the like may be omitted, added, modified, skipped, or the like without departing from the scope of the invention.

Figure 4:
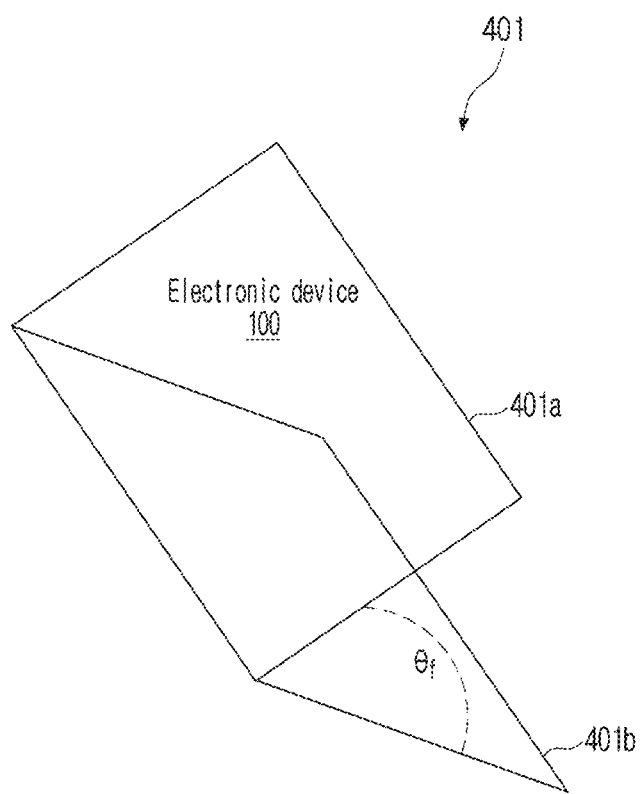
FIG. 4 is an example scenario illustrating a folding angle of the electronic device, according to an example embodiment.
Figure 5A:
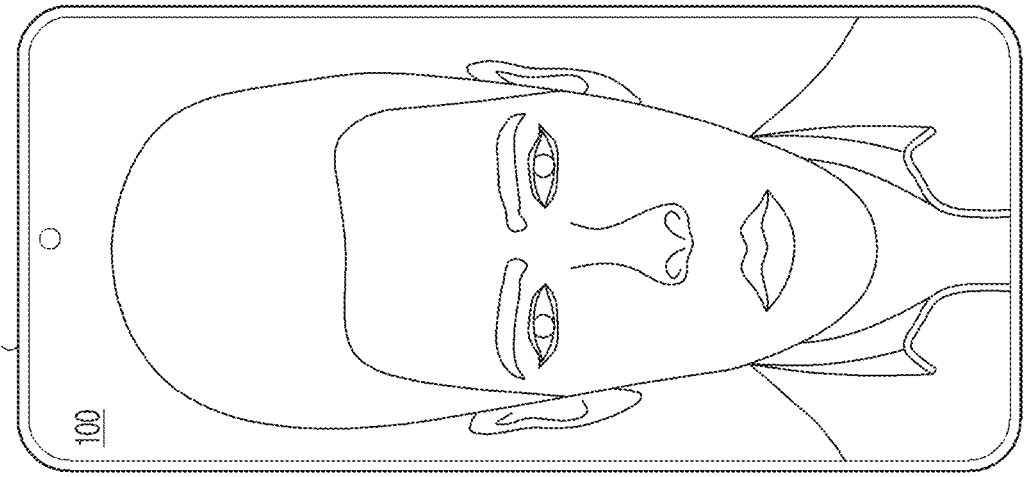
FIGS. 5A-5B is an example scenario illustrating various operations for identifying a viewing distance of a user of the electronic device and a viewing angle of the user of the electronic device, according to an example embodiment.
Figure 5A:
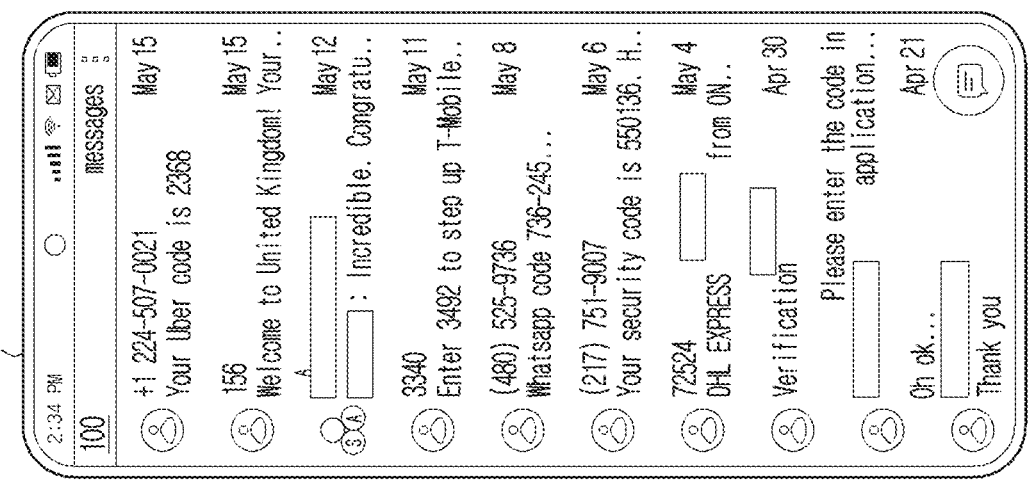
Figure 5A:
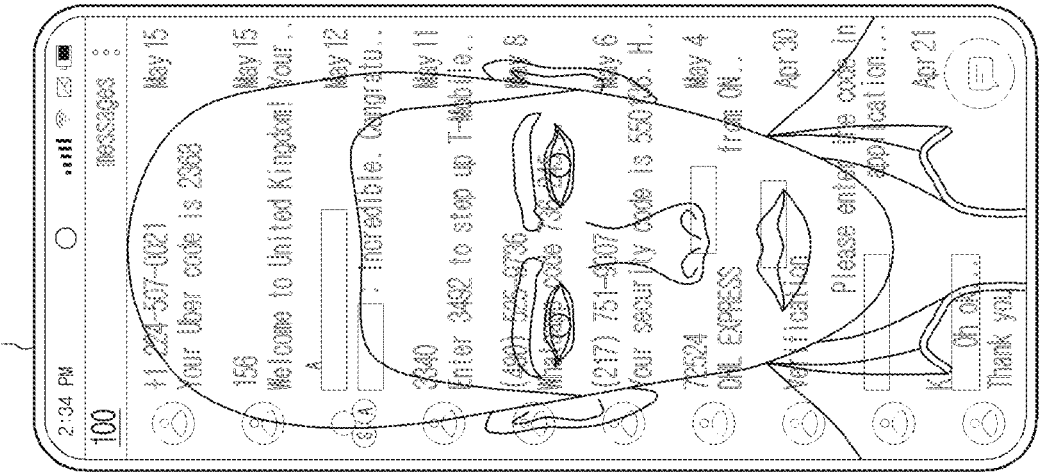
Figure 5B:
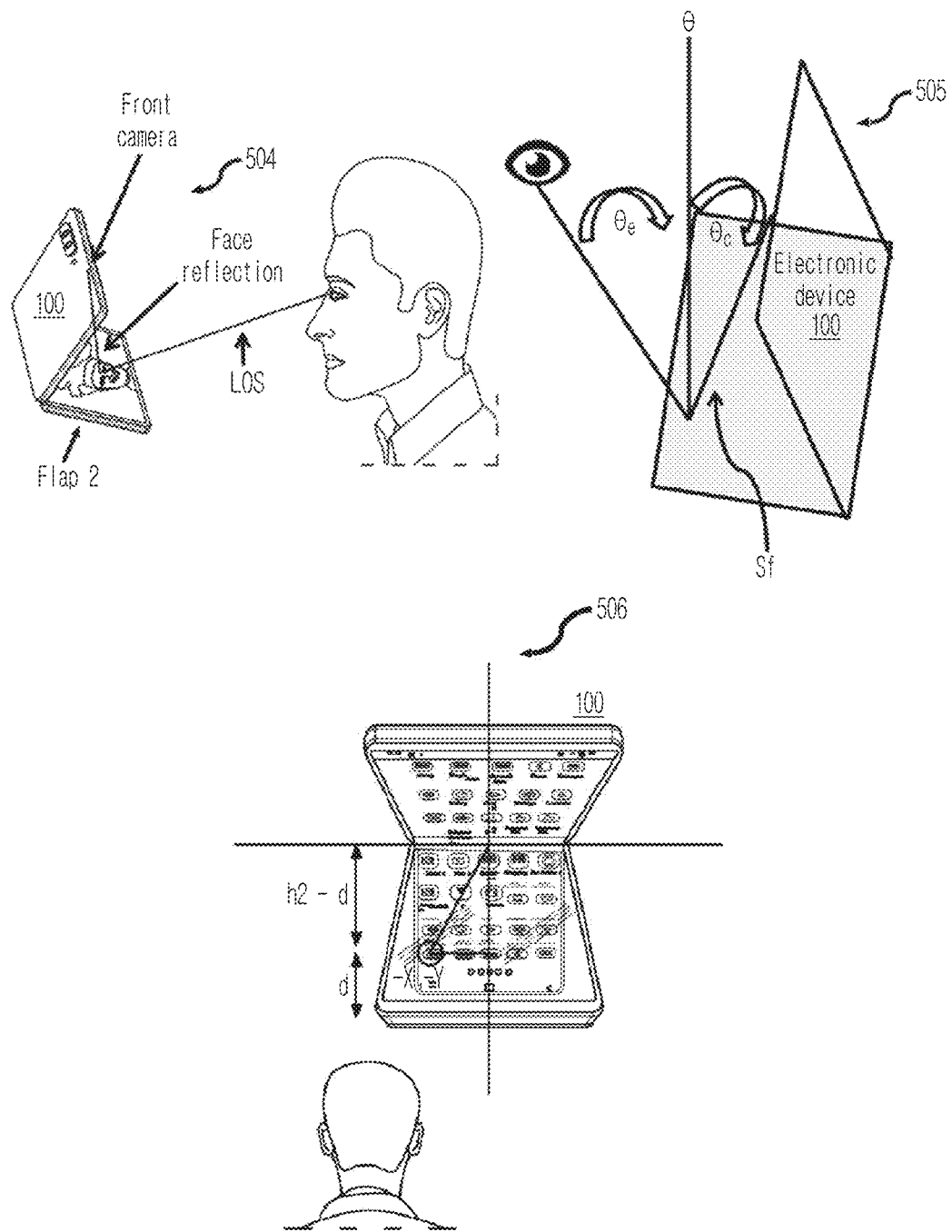

FIG. 4 is an example scenario illustrating the folding angle of the electronic device (100)/401, according to an example embodiment.

A folding property of the electronic device (100)/401 effectively provides with two displays (401a and 401b) linked by a hinge element. The electronic device (100) is configured with several sensors (150), such as a gyroscope and an accelerometer, which may detect rotational, magnetic, and vibrational characteristics. The fold angle identifier (e.g., 170aa in FIG. 3) calculates the folding angle ($\theta f$) between two displays (401a and 401b) formed at the hinge with a help of sensors (150) characteristics provided by the accelerometer and the gyroscope.

FIG. 5 (see FIGS. 5A and 5B) is an example scenario illustrating various operations for identifying the viewing distance (e.g. the distance between the user and the electronic device (100)) of the user of the electronic device (100) and the viewing angle (e.g., the angle between the user and the electronic device (100)) of the user of the electronic device (100), according to an example embodiment.

The view angle identifier (170b) captures the image (501) on the screen (140) of the electronic device (100) using the image sensor (150) (e.g. a front camera of the electronic device (100)/Line Of Sight (LOS) detection). The image (501) including the face of the user of the electronic device (100) is generated on the screen (140) of the electronic device (100) by the reflective characteristic and the displayed content (502) on the screen (140) of the electronic device (100). The displayed content (502) is formed by a graphic processor (120). Further, the view angle identifier (170b) extracts (503) the face of the user of the electronic device (100) by removing the displayed content (502) from the captured image (501). An equation 1 is used to determine the extraction of the face of the user of the electronic device (100), $$\text{Array\_}Ia(503)=\text{Array\_}I_1(501)-\text{Array\_}I_2(502) \tag{1}$$

While using the electronic device (100) in a folded mode or the folding angle (θf) is greater than 90 degrees, the view angle identifier (170b) verifies the identity of the user of the electronic device (100) using face biometrics by identifying a face reflection on a second screen (140) of the electronic device (100) (e.g. down screen). For a non-foldable mode of the electronic device (100), the view angle identifier (170b) verifies the user of the electronic device (100) identity using the face biometrics by using the front camera of the electronic device (100).

Furthermore, the view angle identifier (170b) determines the distance (e.g., 504 in FIG. 5B) between the user and the electronic device (100) by using an example equation 2, $$d_r = \frac{r \times di}{R} \tag{2}$$

where r indicates a size of the user face formed on the second screen (140) of the electronic device (100) by the reflective characteristic (e.g. the second dimension), R indicates a size of the user face extracted using the front camera of the electronic device (100) (e.g. Ia, the first dimension), di indicates the distance (e.g. first distance) between the user face formed on the second screen (140) of the electronic device (100) by the reflective characteristic and the front camera of the electronic device (100), and dr indicates the distance between the user and the electronic device (100) as shown in (504).

As shown in (505), the view angle identifier (170b) determines the angle between the user and the electronic device (100) and the angle of reflection (angle of sight at which the user observes) (506) using the equations 3 and 4, $$\sin\theta c = \left(\left(\frac{h}{2}-\delta\right)^2 + S_f^2 - \frac{h^2}{2}\right)/2 \times \left(\frac{h}{2}-\delta\right) \times (S_f) \tag{3}$$

$$\theta_o = \tan^{-1}\left(\frac{x}{\frac{h}{2}-\delta}\right) \tag{4}$$

where,
: The folding angle of the electronic device (100);
$\theta_c$: The angle of incidence;
$\theta_e$: Angle from a user viewing line;
: Normal to surface;
$S_f$: Line between the front camera and face reflection;
h=height of the electronic device (100);
δ=distance between the user image end coordinate of the electronic device (100).

The front camera of the electronic device (100) is able to recognize the user's face because of the reflection technique. Using the law of reflection (θe=θc), the view angle identifier (170b) gets the viewing angle of the user of the electronic device (100). The coordinates of the user's face will be the midpoint of the reflected user image (Ia). Assuming a fold axis as an x-axis, the angle of view from vertical can be calculated by equation 4.

Figure 6:
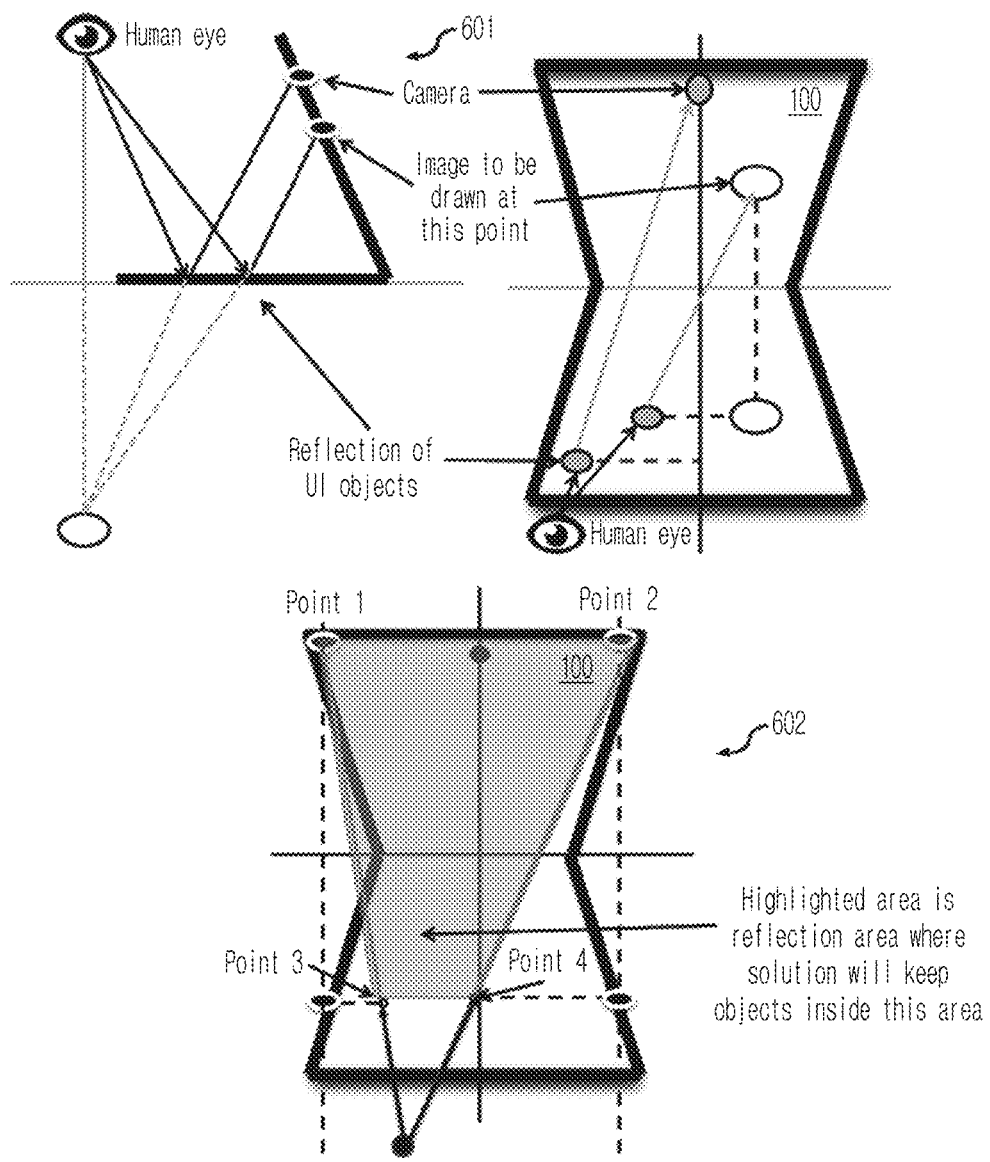
FIG. 6 is an example scenario illustrating various operations for identifying reflection points and a reflection area on the electronic device, according to an example embodiment.

FIG. 6 is an example scenario illustrating various operations for identifying the reflection points and the reflection area on the electronic device (100), according to an example embodiment.

The reflection engine (170c) identifies the reflection points and the reflection area on the screen (140) of the electronic device (100) based on the folding angle (θf), the distance (dr), the angle ($\theta_o$), the angle of reflection (θe). The reflection engine (170c) calculates coordinates (601) of points (X, Y, Z) on a first screen (140) of the electronic device (100) (e.g. upper screen) for its corresponding image formed at (u, v, w) of the second screen (140) of the electronic device (100). The reflection engine (170c) uses a property of reflection & 3D plane analysis. The viewer's coordinate (u, v, w) is formulated based on the distance (dr), the angle ($\theta_o$), and the angle of reflection (θe). where (α, 0, β) is midpoint Coordinate of user image Ia formed by reflection.

Furthermore, the reflection engine (170c) calculates the area in which the reflection will be visible for any particular combination of the folding angle (θf) and the angle ($\theta_o$) (e.g. viewing angle). The reflection engine (170c) uses laws of reflection and 3D plane analysis to calculate the boundary coordinates of the reflection area. Furthermore, the reflection engine (170c) takes corner points (602) (e.g. points 1 & 2) of the first screen (140) of the electronic device (100) as an input and calculates corner points (e.g. points 3 & 4) by following equations, $$\text{point 1} = \tag{5}$$
Left top corner of the electronic device $(100)\left(-\frac{D_b}{2}, \frac{h}{2}\sin\theta f, \frac{h}{2}\cos\theta f\right)$ $$\text{point 2} = \tag{6}$$
Right top corner of the electronic device $(100)\left(\frac{D_b}{2}, \frac{h}{2}\sin\theta f, \frac{h}{2}\cos\theta f\right)$ $$\text{point 3=Reflection of point 1}(\kappa1,0,\varepsilon) \tag{7}$$

$$\text{point 4=Reflection of point 2}(\Lambda2,0,\varepsilon) \tag{8}$$

$$w=dr \cos\theta_0 \tag{9}$$

$$u=dr \sin\theta_o \tag{10}$$

$$v=dr \cos\theta c \tag{11}$$

Here, h is a vertical height of the electronic device (100), Db is a width of the electronic device (100), (Λ1, 0, ε) are (x, y, z) coordinates of the point 3 which is reflection of point 1, similarly for point 4, dr is the viewing distance of the user from the electronic device (100), θf is the folding angle, $\theta_o$ is the viewing angle, and θc is the angle of reflection.

Figure 7A:
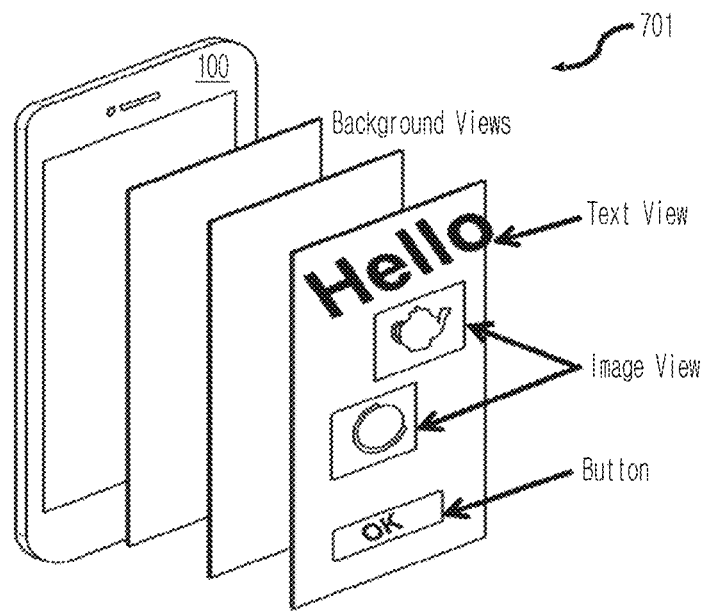
FIGS. 7A-7B is an example scenario illustrating various operations for automatically modifying a display characteristic of each content displayed on a screen of the electronic device based on a view priority score, according to an example embodiment.
Figure 7A:
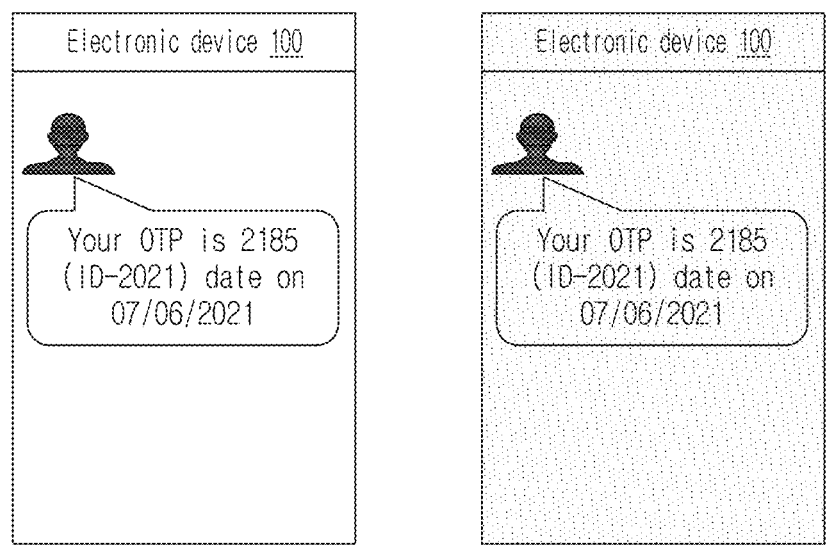
Figure 7B:
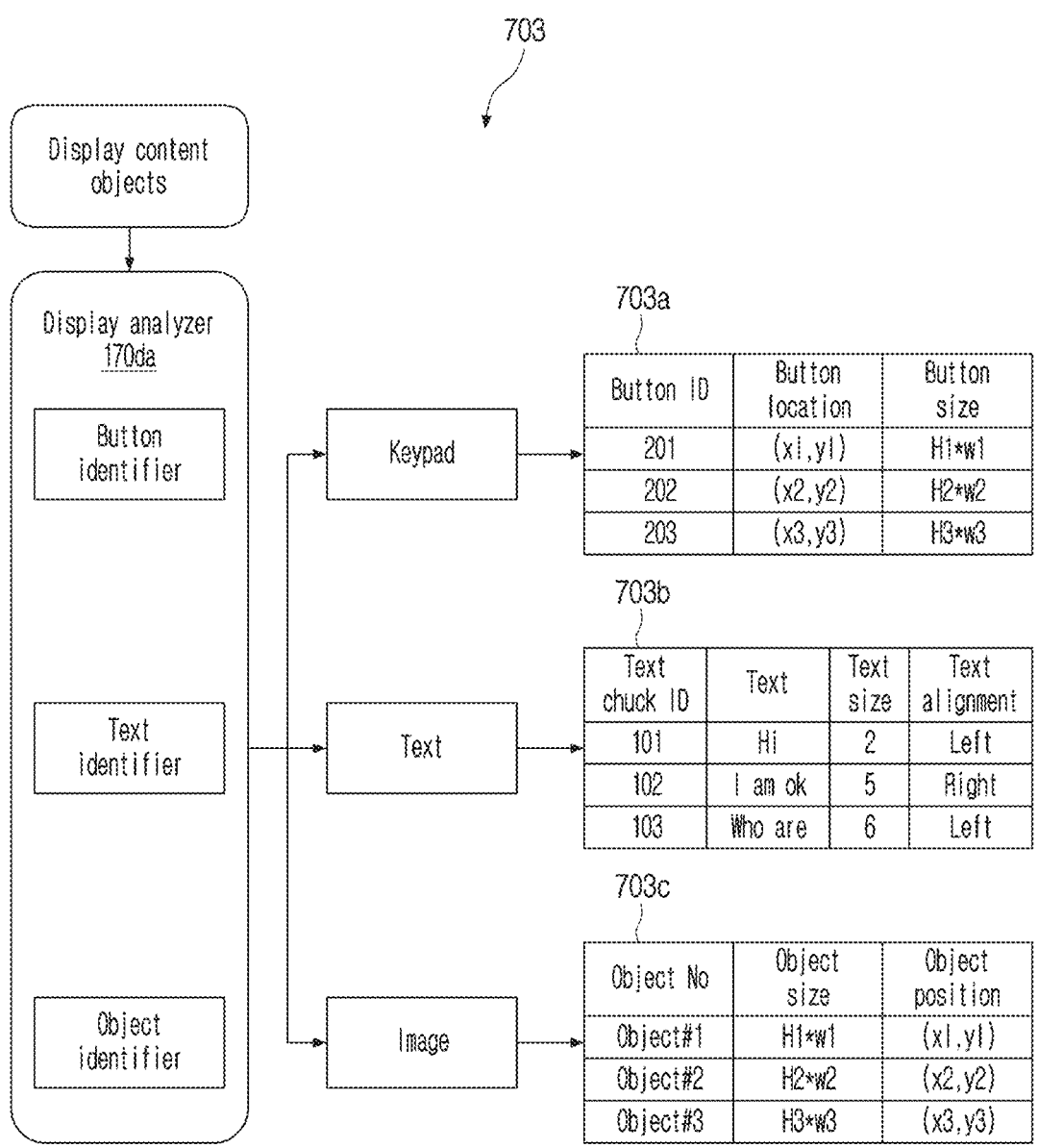

FIG. 7 (see FIGS. 7A and 7B) is an example scenario illustrating various operations for automatically modifying the display characteristic of each content displayed on the screen (140) of the electronic device (100) based on the view priority score, according to an example embodiment.

When the secure mode is activated, the content identifier (170d) determines/assigns (701) the view priority score of each content displayed on the screen (140) of the electronic device (100). The user interface of each content is changed in such a way that the user interface favors the process of reflection and changes view's theme (color intensity) to apply a reflective property in each view by the following equation, $$\text{View priority} = \frac{1}{\text{View\_Order}} \times \frac{\text{device\_Size}}{\text{View\_Size}} \quad (12)$$

where,

View_order=Z-order of a view (lower Z-order will have low priority);

View_size=View dimension (width×height): bigger size will have low priority;

Device_size=Dimension of the electronic device (100) (width×height);

View priority=Priority of a view to change view theme (color intensity) to apply reflective property.

The content identifier (170*d*) assigns the view priority score to each content displayed on the screen (140) of the electronic device (100) based on the view order, the view size, and the size of the electronic device (100), where each content includes the surface view, the text view, the video view, the image view, the button, and the checkbox. For example, view priority calculation for each view, as shown in Table. 1.

TABLE 1

| Views | View height | View width | Device height | Device width | Z-order | View priority |
|---|---|---|---|---|---|---|
| Text view | 50 | 70 | 640 | 280 | 1 | 51.2 |
| Image view | 50 | 50 | 640 | 280 | 1 | 71.68 |
| Image view | 640 | 280 | 640 | 280 | 2 | 0.5 |
| Layout | 640 | 280 | 640 | 280 | 3 | 0.333333 |

Increasing a view's Z-order decreases view's view priority (changes to a darker theme); smaller views have higher view priority (Changes in a lighter theme). Changing the color intensity (702) in a calculated ratio will enhance the reflective characteristic. For example (702), the text view has a high priority (e.g. 51.2), so the color intensity of the text view adjusts to the brighter theme, but the background (layout) has a low priority (e.g. 0.33333), so the color intensity of the background adjusts to the darker theme.

The content identifier (170*d*) modifies RGB of the view based on the view priority, and brightness of the electronic device (100) changes display characteristic intelligently. For example, higher view priority has a more reflective characteristic, e.g. increase towards bright, and lower view priority has a less reflective characteristic, e.g. increase towards dark. The content identifier (170*d*) determines the higher view priority or lower view priority based on a pre-defined threshold, the pre-defined threshold calculation and color enhancement calculation are given by the following equations, $$\text{Priority \%}(\text{View } v) = \frac{\text{Priority (View } v)}{\max\limits_{i=1}^{n} \text{Priority}(\text{View } i)} \times 100 \quad (13)$$

Where Priority % (View) is defined as a priority of view divided by max priority available for any view on screen at that time;

i. If Priority % (View)<30:

$$\text{Update view } (R, G, B) = R \times \frac{\text{Priority \%}}{100}, \quad (14)$$

$$G \times \frac{\text{Priority \%}}{100}, B \times \frac{\text{Priority \%}}{100}$$

If the priority threshold less than 30, reduce bright colors for low priority views;

ii. If Priority % (View)>30:

$$\text{Change Factor} = \left(1 + \frac{\text{PriorityChang}}{\max(R, G, B)}\right) \times \log_{500} Lux \quad (15)$$

Where, Updated view(R, G, B)=R×changeFactor

G×changeFactor

B×changeFactor

If the priority threshold greater than 30 increase bright colors for high priority views.

The reason for the threshold priority percent value of 30 is because the identified reflection region is around 30% of the overall screen area of the electronic device (100) for views in the highest levels on average. As a result, the secured content must fit inside the reflection region. Views with a priority percentage greater than 30 are generally those having sensitive and private user material that must be protected.

The content identifier (170*d*)/display analyzer (170*da*) extracts the plurality of objects (703) from the displayed content, where the plurality of objects comprise the image object, the text object, and the button object. Furthermore, the content identifier (170*d*) generates the array of each object (703*a*, 703*b*, 703*c*) of the plurality of objects. The array includes the object ID, the location of the object on the screen (140) of the electronic device (100), the size of the object, the alignment of the object on the screen (140) of the electronic device (100), and the position of the object on the screen (140) of the electronic device (100).

FIGS. 8A-8D are example scenarios illustrating various operations for automatically splitting the confidential portions and the non-confidential portions of the content displayed on the screen (140) of the electronic device (100) based on the confidentiality score, according to an example embodiment.

The content splitter and modifier (170*e*) receives the array of each object (703*a*, 703*b*, 703*c*) of the plurality of objects and separates/divides important content from the screen (140) of the electronic device (100), and provides this input to the content placement engine (170*f*). Furthermore, the content splitter and modifier (170*e*) resizes each object of the plurality of objects/each content and layout of the screen (140) by passing the generated array (703*a*, 703*b*, 703*c*) into the framework of the electronic device (100). Each object and the layout is resized based on reflection points, reflection area, the folding angle (θf), the distance (dr), the viewing angle (θ$_o$), the angle of reflection (θe). The framework of the electronic device (100) calculates window size, which includes screen layout and reflection points by the following equation, $$\text{New Window size} = \frac{\text{Refection Area}}{2} \quad (16)$$

Furthermore, the resized content is fed through the confidentiality engine (170di) that was trained on a dataset of view components. The confidentiality engine (170di) generates the confidentiality score using a learning and feedback process. The confidentiality engine (170di) of the content splitter and modifier (170e) calculates the confidentiality score by the following equations, $$\text{Secure Score (confidential score)} = \frac{\text{CLASS\_SCORE} \times \text{COLOR\_SCORE} \times \text{ACTION\_SCORE}}{\text{SIZE\_RATIO}} \quad (17)$$

Where, $$\text{Size ratio} = \frac{\text{Object Size}}{\text{Window Size Available}} \quad (18)$$

$$\text{Action score} = 1\text{:non-clickable, 2:clickable} \quad (19)$$

$$\text{Color score} = \max\left(\frac{R}{255}, \frac{G}{255}, \frac{B}{255}\right) \quad (20)$$

$$\text{Class score} = 1\text{:Public, 2:Personal, 3:Confidential} \quad (21)$$

The higher the secure score, the higher the emphasis given to secure content. Because of the restricted available reflection area, important (confidential & personal) objects with smaller sizes are given greater weight in the size ratio. The clickable objects are given more weight in the action score since they participate in more user interaction and must be secured. The confidentiality score provides greater weight to bright colors since they reflect more light. Confidential and personal objects are favored in terms of security over public ones for the class score. For example, classification calculation for each view/object, as shown in Table. 2.

TABLE 2

| Object type | Object description | Object area | View color | Classification | Secure score |
|---|---|---|---|---|---|
| Image | Face | 900*500 | (25, 32, 21) | Confidential | 71.45 |
| Button | Click here to continue | 200*100 | (94, 72, 46) | Public | 13.11 |
| Button | 8 (PIN interface) | 100*100 | (125, 92, 61) | Confidential | 418.15 |
| Text | OTP is 12345 | 40*80 | (62, 43, 38) | Confidential | 64.89 |
| Image | Body part | 600*300 | (84, 72, 96) | Personal | 71.45 |
| Text | I will meet you at cafe | 400*80 | (32, 120, 82) | Personal | 29.77 |
| Image | Vehicle | 150*100 | (76, 62, 21) | Public | 8.29 |

Furthermore, the content splitter and modifier (170e) sorts the calculated confidential score by following equations, $$\text{Sorted array of objects(ObjArr)} = \text{SortByHighScore (Confidentiality Score)} \quad (22)$$

The top m objects are chosen to be sliced & kept on the upper fold such that:

$$\sum_{k=1}^{m} \text{View size } (ObjectArr_i) <= \frac{\text{Available Window Size}}{2} \quad (23)$$

The summation of top m objects will be less than 50% of the available window size. The content splitter and modifier (170e) selects objects to be secured whose sizes sum up to be less than or equal to 50% of the window size (which means 25% of reflection area). Creating 50% slices for reflection will make a strong pattern, for any other person nearby the electronic device (100), data won't be understandable. For example, the content splitter and modifier (170e) performs various action performed on each view/object/content for splitting and modification, as shown in Table. 3.

TABLE 3

| Content-type | Action type | Action taken | Secure logic |
|---|---|---|---|
| Financial data (Card No./OTP etc.) | Read | Small text identified as important. (1 full digit + half of 2$^{nd}$ digit) are sliced and put on alternate folds | This kind of security step is taken so that any person other than the main user is not able to read any single digit/character |
| Image/gallery | Read | Objects with higher secure score are sent on the upper fold | All the confidential/personal information in the image is conveyed to the main user only |
| Chats/social media | Read/Write | Horizontal fold: Messages with higher secure score are sent on the upper fold Vertical fold: Messages with higher secure score are shown as the reflection | The conversations between any 2 or more persons remain private & only visible to the main user |
| Password/PIN | Write | The keys with higher secure score are reflected such that the user can provide input by pressing on reflected part on the lower fold | The passwords remain private and device security is ensured |

Figure 8A:
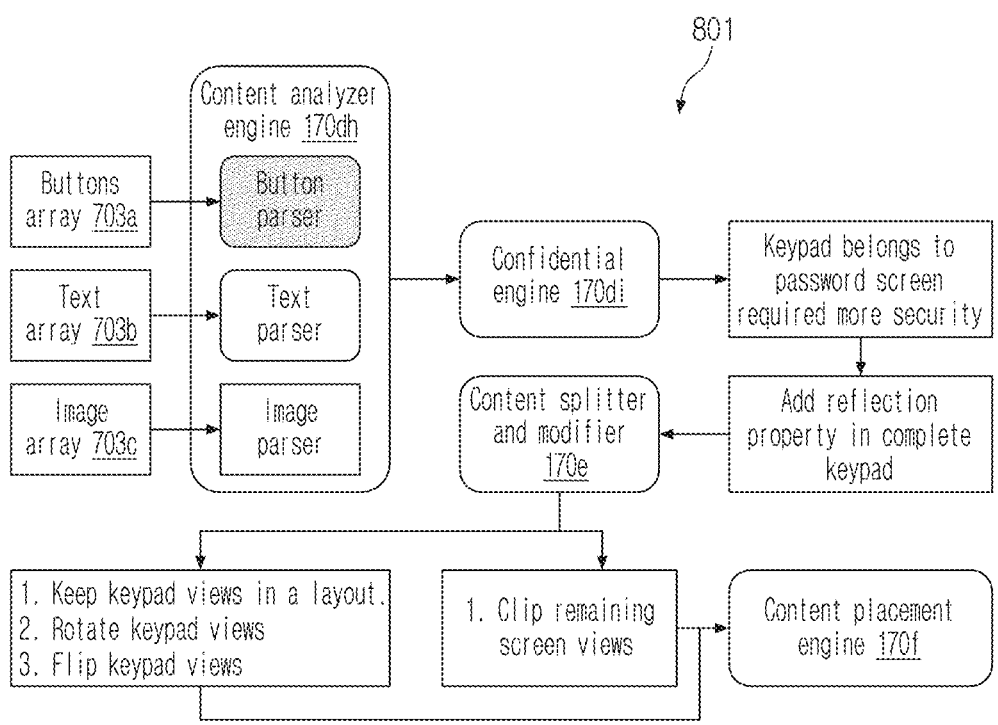
FIG. 8A-8E are example scenarios illustrating various operations for automatically splitting the confidential portions and the non-confidential portions of the content displayed on the screen of the electronic device based on the confidentiality score, according to an example embodiment.
Figure 8A:
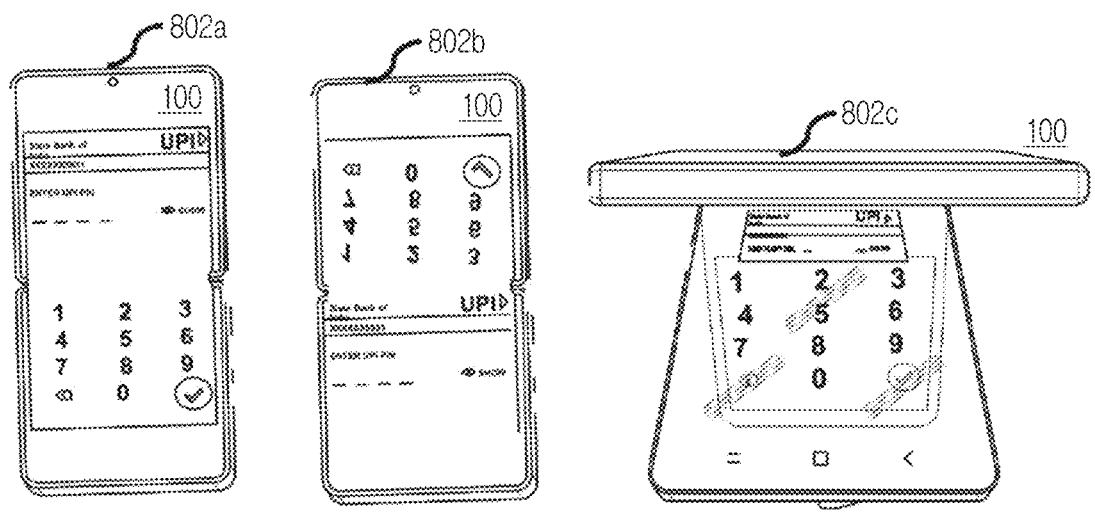

Referring to FIG. 8A: for example (801), the content analyzer engine (170*dh*) of the content splitter and modifier (170*e*) receives the array of each object (703*a*, 703*b*, 703*c*) of the plurality of objects. Then, the confidentiality engine (170*di*) of the content splitter and modifier (170*e*) calculates the confidentiality score and applies a specific action and a secure logic to the content type which has high confidentiality scores (e.g. button parser for the password and Personal Identification Number (PIN) in this example scenario). Then, the content splitter and modifier (170*e*) sends the content type with an applied specific action and secure logic to the content placement engine (170*f*) to determine the optimal place for the content type.

The password or PIN (802*a*) has always been vital for every user, and when used in public, the password or PIN exposes the user to a variety of risks. If any edited text with a password attribute gets attention, the keypad becomes critical for the user for security reasons. As a result, the entire keypad should be guarded by the content splitter and modifier (170*e*). The content splitter and modifier (170*e*) utilizes the reflection property to make it secure. To add the reflection property to the whole keypad, the proposed method transfers the keypad to the upper fold (802*b*), allowing the user to utilize the keypad with reflection. The remaining of the layout will be drawn on the lower fold (802*c*).

Figure 8B:
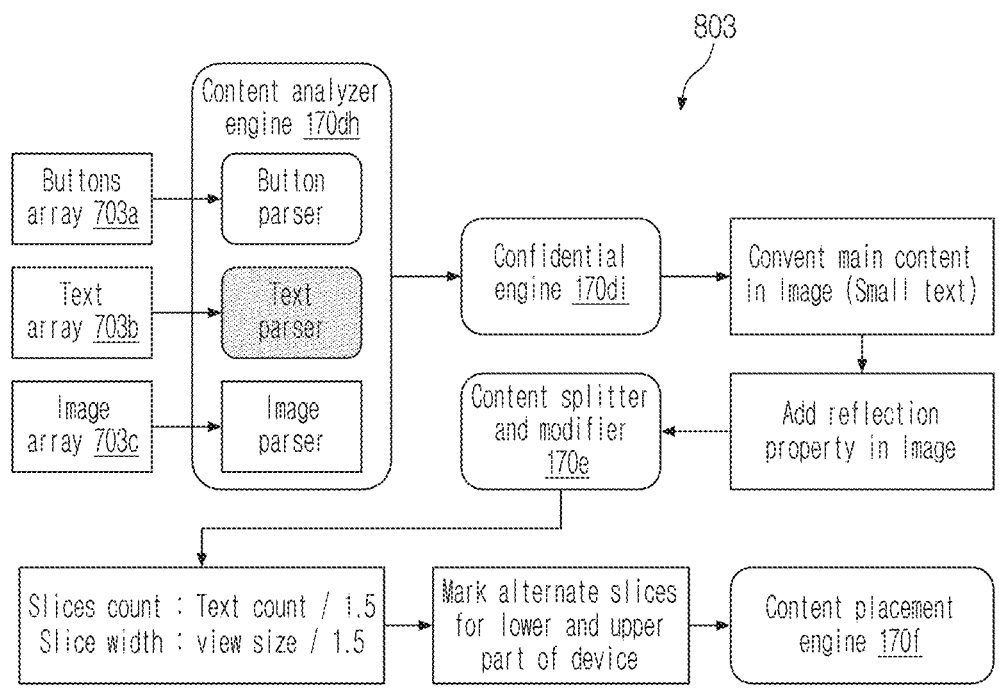
Figure 8B:
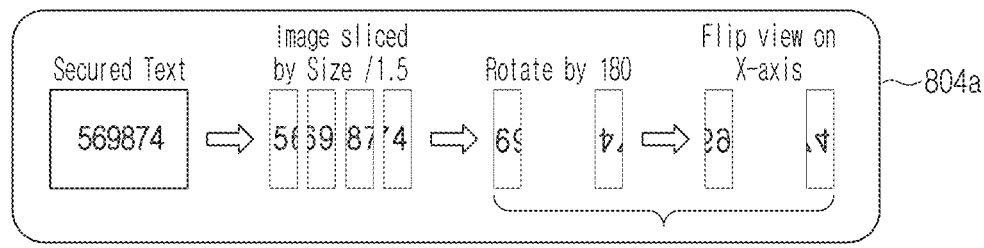
Figure 8B:
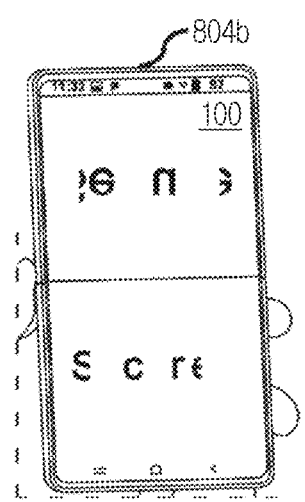
Figure 8B:
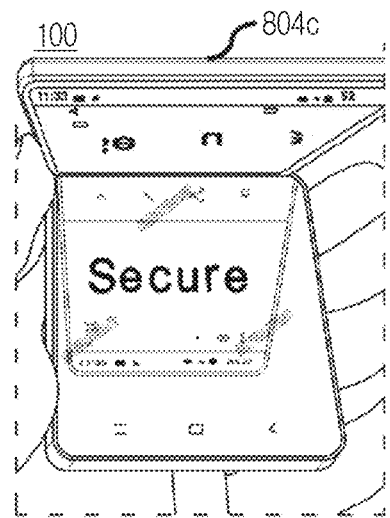

Referring to FIG. 8B, for example (803), the content analyzer engine (170*dh*) of the content splitter and modifier (170*e*) receives the array of each object (703*a*, 703*b*, 703*c*) of the plurality of objects. Then, the confidentiality engine (170*di*) of the content splitter and modifier (170*e*) calculates the confidentiality score and applies the specific action and secure logic to the content type which has the high confidentiality scores (e.g. text parser for secure text/One Time Password (OTP)/number in this example scenario). Then, the content splitter and modifier (170*e*) sends the content type with the applied specific action and secure logic to the content placement engine (170*f*) to determine the optimal place for the content type. Each "engine" herein may comprise corresponding circuitry.

If the text contains transactional text, such as a protected OTP (804*a*), the content requires further protection. The content splitter and modifier (170*e*) divides the content into slices and placing them on different folds, and after employing reflection and integrating both screen content, only the user of the electronic device (100) has visibility for the secure material. The width of the slices is view size/1.5, each slice will have one and a half text character size. The slicing logic is slicing every 1 full+one half of the next digit, the digits are not accessible to any other person. If any other person else tries to see the content, any other person will only be able to see sliced content. When the slice count is text count/1.5, half of the slices are drawn at the lower fold and the other half are mirrored by the upper fold (804*b*-804*c*).

Figure 8C:
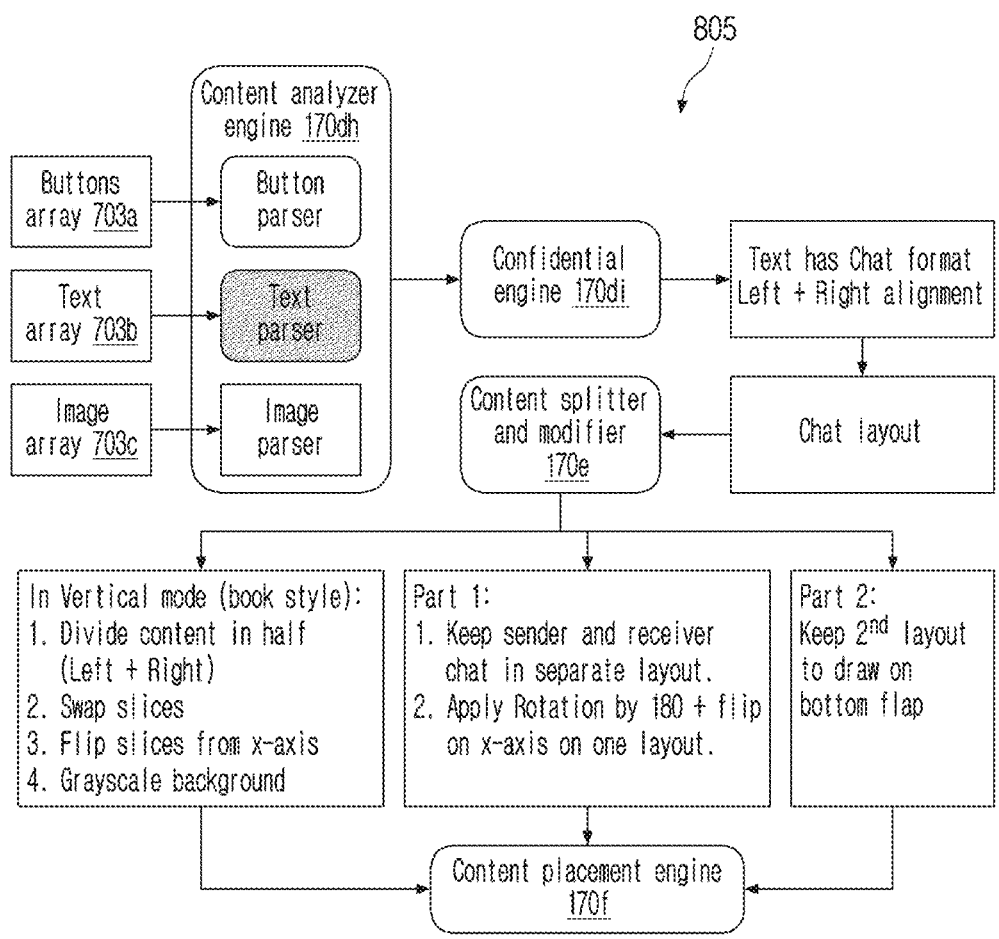
Figure 8C:
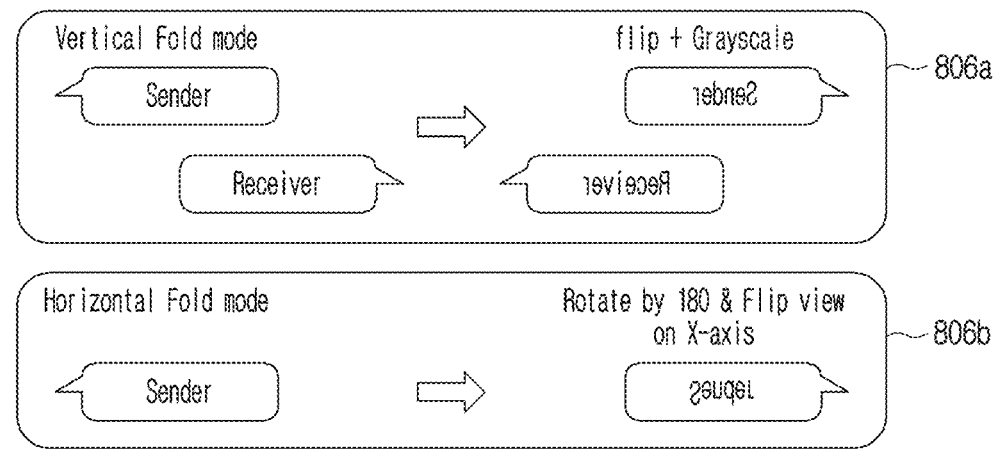
Figure 8D:
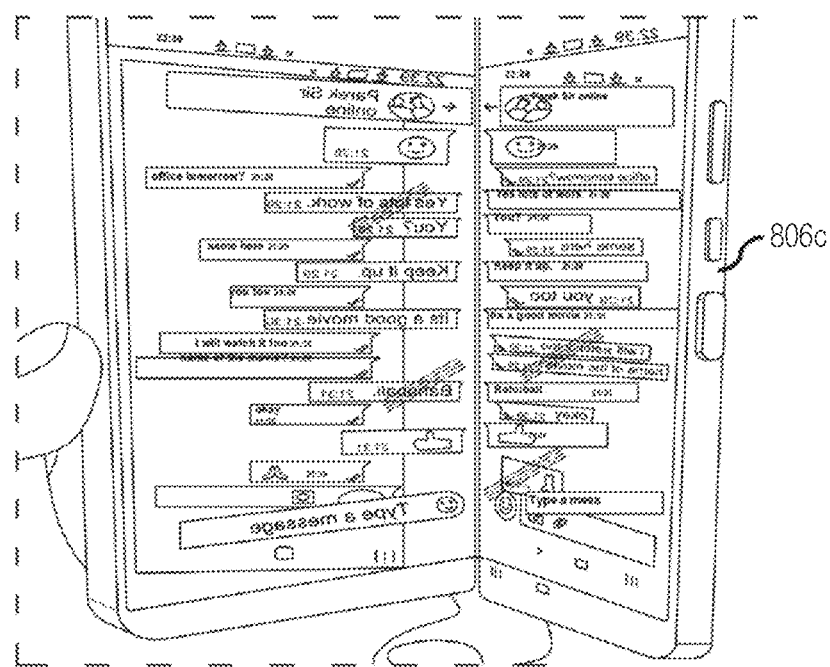
Figure 8D:
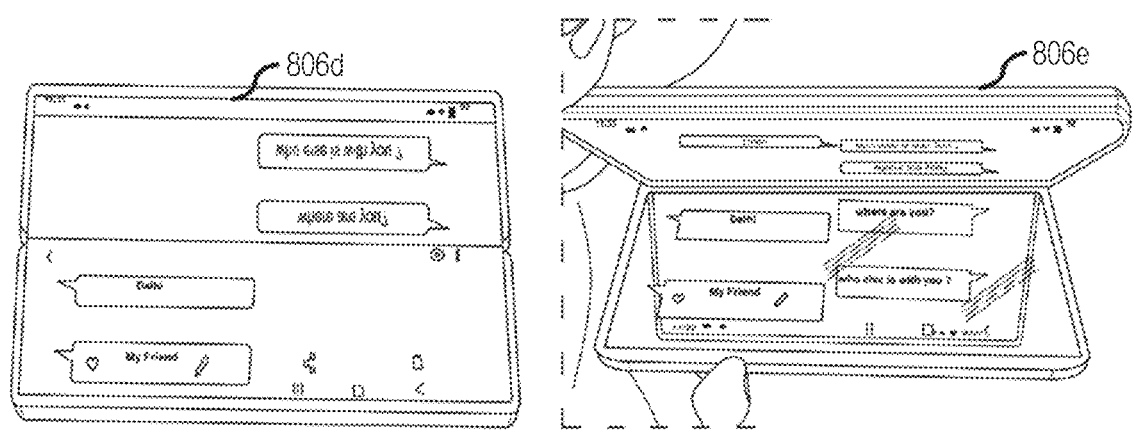

Referring to FIG. 8C, for example (805), the content analyzer engine (170*dh*) of the content splitter and modifier (170*e*) receives the array of each object (703*a*, 703*b*, 703*c*) of the plurality of objects. Then, the confidentiality engine (170*di*) of the content splitter and modifier (170*e*) calculates the confidentiality score and applies the specific action and secure logic to the content type which has the high confidentiality scores (e.g. text parser for chat format in this example scenario). Then, the content splitter and modifier (170*e*) sends the content type with the applied specific action and secure logic to the content placement engine (170*f*) to determine the optimal place for the content type.

If the text is detected as a chat, more protection is required because this is personal data. Generally, left-handed chats will be marked as a sender, while right-handed chats will be tagged as a recipient. The content splitter and modifier (170*e*) separates the content into two parts for horizontal folds (e.g., 806*b*, 806*d*, 806*e*) (e.g., left part as sender and right being receiver). The content splitter and modifier (170*e*) then modifies the display property of the identified parts by inverting, flipping, and eliminating the color of the identified chat. The content splitter and modifier (170*e*) divides the content in half (Left+right)+swap+flip+grayscale for vertical fold (book style) (806*a*, 806*c*). The content splitter and modifier (170*e*) then adds a color in the reflection area (increase visibility) of the reflected part. So, the user of the electronic device (100) can view the chat securely now as the chat will be visible only in the reflected part when the electronic device (100) is folded.

Figure 8E:
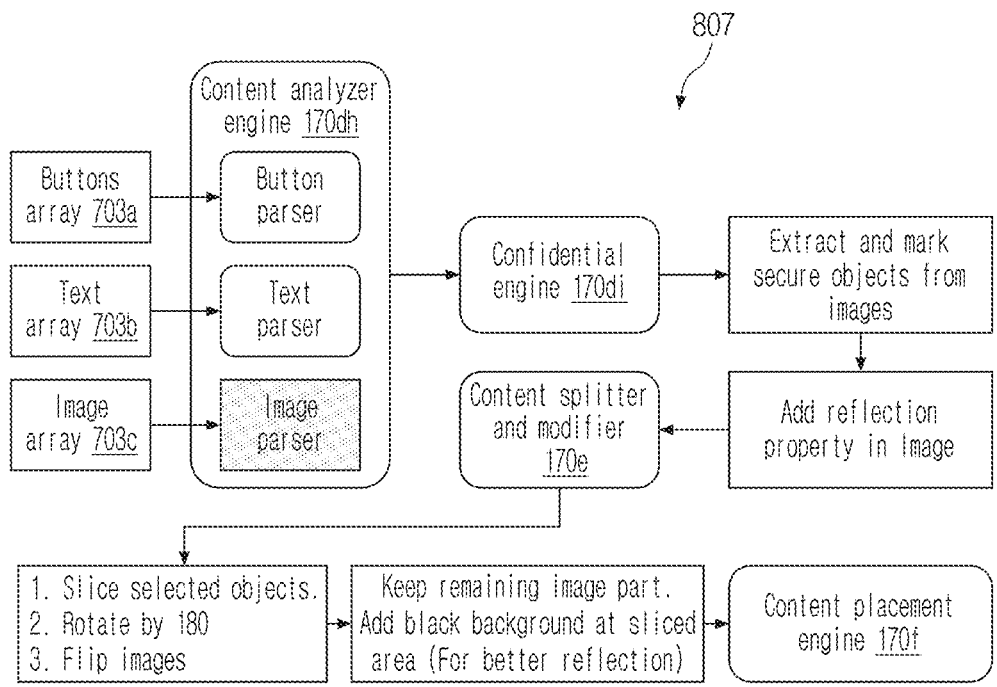
Figure 8E:
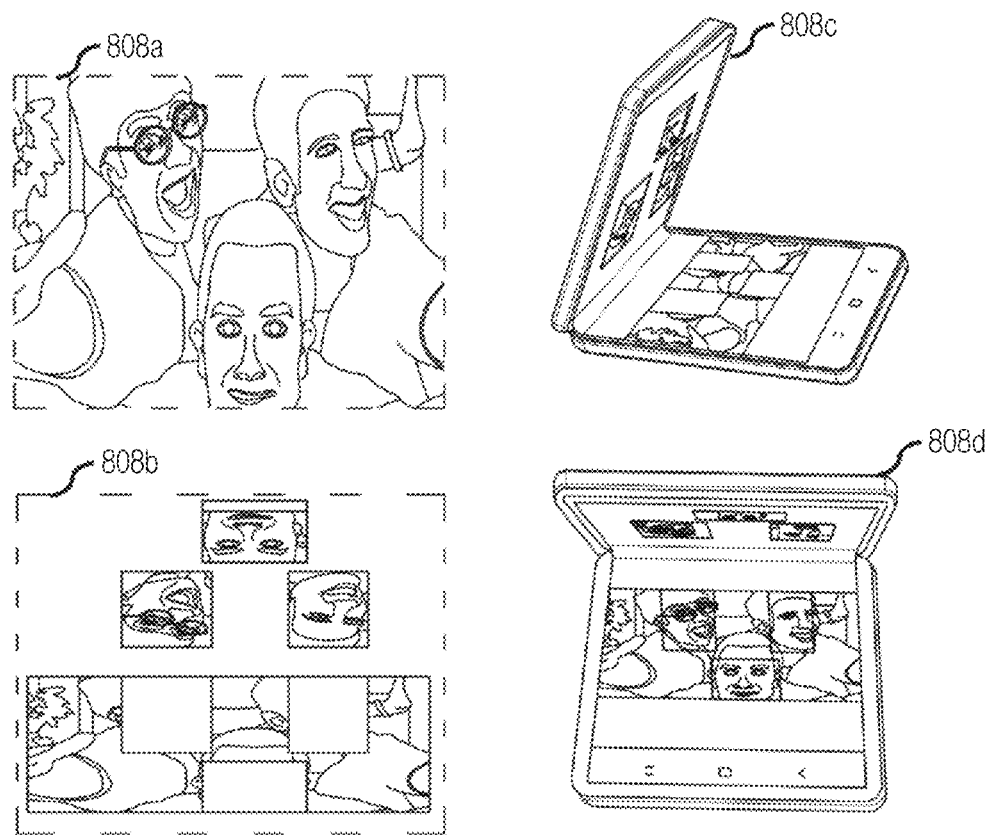

Referring to FIG. 8E: for example (807), the content analyzer engine (170*dh*) of the content splitter and modifier (170*e*) receives the array of each object (703*a*, 703*b*, 703*c*) of the plurality of objects. Then, the confidentiality engine (170*di*) of the content splitter and modifier (170*e*) calculates the confidentiality score and applies the specific action and secure logic to the content type which has the high confidentiality scores (e.g. image parser for an image in this example scenario). Then, the content splitter and modifier (170*e*) sends the content type with the applied specific action and secure logic to the content placement engine (170*f*) to determine the optimal place for the content type.

Images (808*a*) can be very personal to any user and when viewed in a public place that too in a foldable/electronic device (100) in which there are simultaneous screens available at a time, it increases the threat of being viewed by nearby any other person. The content splitter and modifier (170*e*) extract and identify secure objects from the given image (808*a*). These objects can be anything between face, body parts, etc. Identified secure objects are then sliced, rotated by 180, and then flipped to the upper fold while the remaining image remains on the lower fold (808*b*). Sliced secured objects are added with a black background to enhance reflection property and using reflection is finally viewed by the user securely. If any other person else tries to see the content, they will only be able to see sliced content (808*c*). The content splitter and modifier (170*e*) then adds the color in the reflection area (increase visibility) of the reflected part. So, the user of the electronic device (100) can view the image securely (808*d*) now as the image will be visible only in the reflected part when the electronic device (100) is folded.

Figure 9:
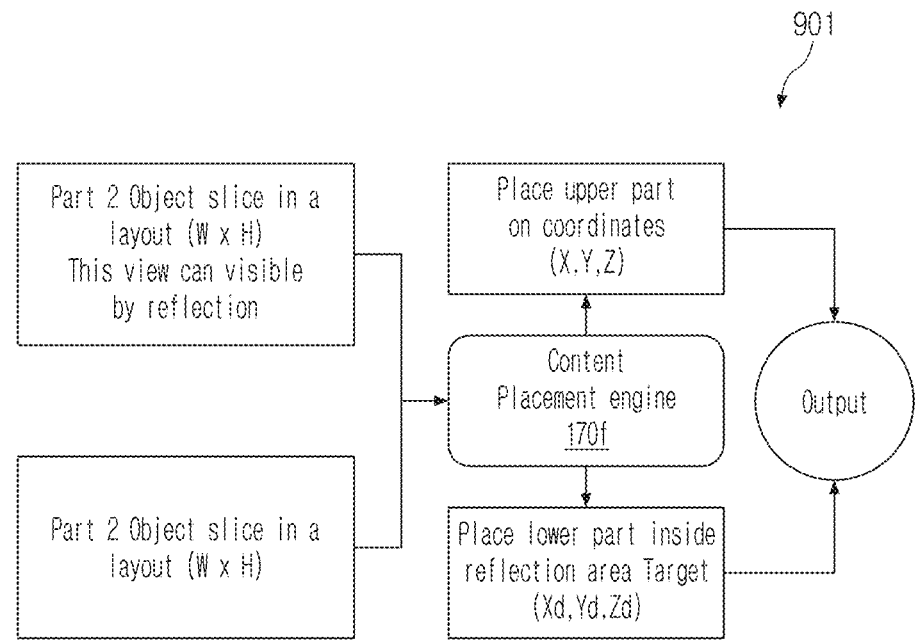
FIG. 9 is an example scenario illustrating various operations for intelligently placing the confidential portions and the non-confidential portions on the screen of the electronic device, according to an example embodiment.
Figure 9:
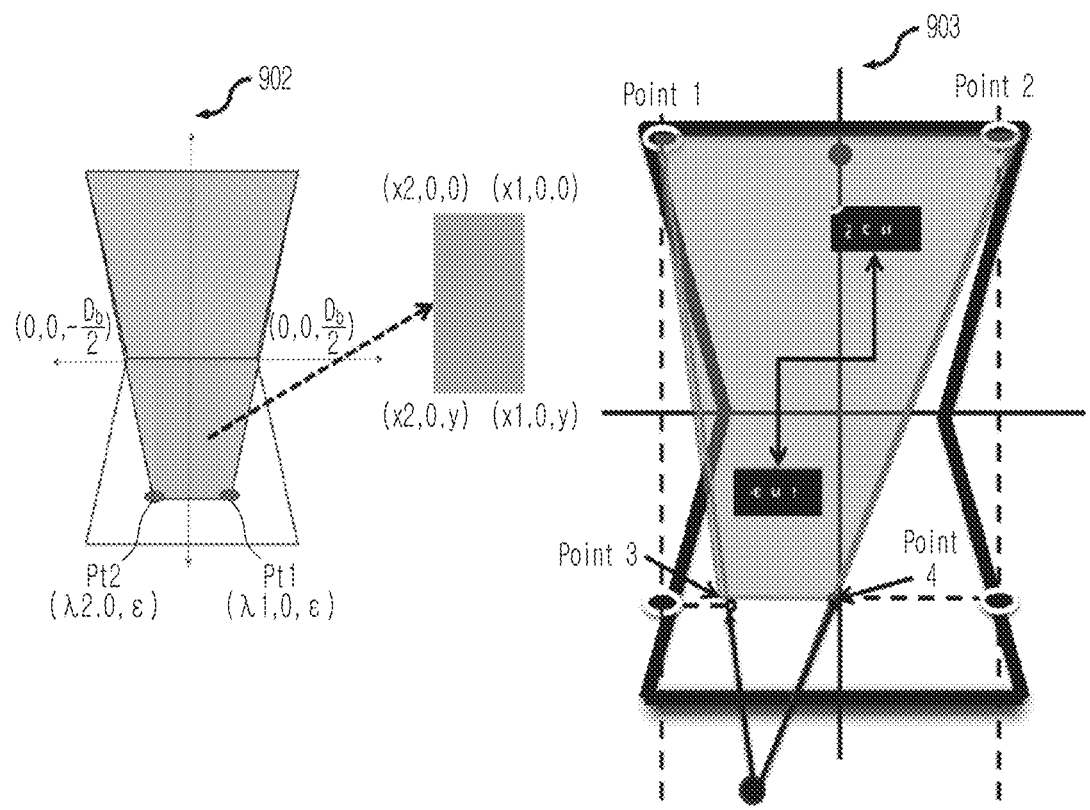

FIG. 9 is an example scenario illustrating various operations for intelligently placing the confidential portions and non-confidential portions on the screen (140) of the electronic device (100), according to an example embodiment.

The content placement engine (170*f*) receives inputs (901) from the content splitter and modifier (170*e*). Then, the content placement engine (170*f*) places (determines the optimal place for) the confidential portions of the content displayed on the screen (140) of the electronic device (100) based on the reflection points, the reflection area, the folding angle ($\theta f$), the distance (dr), the viewing angle ($\theta_o$), the angle of reflection ($\theta e$) (903).

Along with slicing and modify the content so that it can be reflected on the lower fold, the content placement engine (170*f*) ensures that the content has been placed well within the reflection area (902). The content placement engine (170*f*) ensures to specify a placing area well within the reflection area. The content placement engine (170*f*) determines a rectangle with a maximum or large area that can be placed within the reflection area. Furthermore, the content placement engine (170f) calculates the rectangle with the maximum or large area that can be placed within the reflection area by the following equations, $$y = \min\left(\varepsilon, \frac{h}{2}\right) \quad (24)$$

$$x1 = \min\left(\lambda 1, \frac{Db}{2}\right) \quad (25)$$

$$x2 = \max\left(\lambda 2, -\frac{Db}{2}\right) \quad (26)$$

Here, $\lambda 1$ and $\lambda 2$ are the x coordinates of reflection point of both upper corner points of device, h indicates height of the electronic device (100) and c is the y coordinate of reflection of upper corner points of the electronic device (100).

The proposed method is also applicable for non-foldable electronic device (e.g. electronic device (100)), difference in calculation of priority and confidence score calculation for each object, which is explained below. The content identifier (170d) modifies RGB of the view based on the view priority, and brightness of the electronic device (100) changes display characteristic intelligently. For example, higher view priority has increase darkness of view for security and lower view priority has increase brightness of a view. The content identifier (170d) determines the higher view priority or lower view priority based on a pre-defined threshold, the pre-defined threshold calculation and color enhancement calculation are given by the following equations, $$\text{Priority \%(View } v) = \frac{\text{Priority (View } v)}{\max_{i=1}^{n} \text{Priority(View } i)} \times 100 \quad (27)$$

Where Priority % (View) is defined as a priority of view divided by max priority available for any view on screen at that time;

i. If Priority % (View)>40:

$$\text{Update view } (R, G, B) = R \times \frac{\text{Priority \%}}{100}, \quad (28)$$

$$G \times \frac{\text{Priority \%}}{100}, B \times \frac{\text{Priority \%}}{100}$$

If the priority threshold greater than 40, reduce bright colors for high priority views;

ii. If Priority % (View)<40:

$$\text{Change Factor} = \left(1 + \frac{\text{PriorityChang}}{\max(R, G, B)}\right) \times \log_{500} Lux \quad (29)$$

Where, Updated view(R, G, B)=R×changeFactor

G×changeFactor

B×changeFactor

If the priority threshold lesser than 40 increase bright colors for low priority views.

The reason for the threshold priority percent value of 40 is because, on an average, 40% of the screen area is covered up by components which can have content like messages & text, pictures etc. For example, text is high priority view, contact image is high priority view, text background is low priority view and window background is low priority view.

Then, the content identifier (170d)/display analyzer (170da) extracts the plurality of objects (703) from the displayed content, where the plurality of objects comprise the image object, the text object, and the button object. Furthermore, the content identifier (170d) generates the array of each object (703a, 703b, 703c) of the plurality of objects. The array includes the object ID, the location of the object on the screen (140) of the electronic device (100), the size of the object, the alignment of the object on the screen (140) of the electronic device (100), and the position of the object on the screen (140) of the electronic device (100).

The content splitter and modifier (170e) receives the array of each object (703a, 703b, 703c) of the plurality of objects and separates/divides important content from the screen (140) of the electronic device (100), and provides this input to the content placement engine (170f). Furthermore, the content splitter and modifier (170e) passes the generated array (703a, 703b, 703c) into the framework of the electronic device (100). Furthermore, the content is fed through the confidentiality engine (170di) that was trained on a dataset of view components. The confidentiality engine (170di) generates the confidentiality score using a learning and feedback process. The confidentiality engine (170di) of the content splitter and modifier (170e) calculates the confidentiality score by the following equations, $$\text{Secure Score (confidential score)} = \frac{\text{CLASS\_SCORE} \times \text{COLOR\_SCORE} \times \text{ACTION\_SCORE}}{\text{SIZE\_RATIO}} \quad (30)$$

Where, $$\text{Size ratio} = \frac{\text{Object Size}}{\text{Window Size Available}} \quad (31)$$

$$\text{Action score} = 1\text{:non-clickable, 2:clickable} \quad (32)$$

$$\text{Color score} = \max\left(\frac{R}{255}, \frac{G}{255}, \frac{B}{255}\right) \quad (33)$$

$$\text{Class score} = 1\text{:Public, 2:Personal, 3:Confidential} \quad (34)$$

The higher the secure score, the higher the emphasis given to secure content. Because of the restricted available reflection area, important (confidential & personal) objects with smaller sizes are given greater weight in the size ratio. The clickable objects are given more weight in the action score since they participate in more user interaction and must be secured. The confidentiality score provides greater weight to bright colors since they reflect more light. Confidential and personal objects are favored in terms of security over public ones for the class score.

Furthermore, the content splitter and modifier (170e) sorts the calculated confidential score by following equations, $$\text{Sorted array of objects(ObjArr)=SortByHighScore (Confidentiality Score)} \quad (35)$$

The top m/2 important objects are chosen to be sliced & chosen to provide security from the peepers, these objects are selected on the basis of their high confidentiality score which takes into account such as their confidential score, size score, color score, and class score etc. of the object. Further, in the case of the non-foldable electronic device (e.g. electronic device (100)), a degree of translucence (a) for providing additional security to chosen objects. The degree of translucence (a) is proportional to the confidentiality score which indicates that the more importance the object has, the more translucency is provided for its security. The a is calculated as:

$$\alpha = 255\left[1 - \frac{0.9 * \text{Confidentality\_Score}}{\max_{i=1 \text{ to } n} \text{Confidentality\_Score}}\right] \quad (36)$$

This overlapping slices shows content in such a way that reduced the translucency part hard to identify, if another user is looking from side. The slices are of the confidential parts on the screen (140) of the electronic device (100). The slices don't overlap, instead they combine with the non-confidential part to form the content on screen (140) of the electronic device (100). The confidential part have added translucency which makes it hard to be read for surrounding viewers/other users. The translucency reduces the intensity for anyone at distance from the screen (140) of the electronic device (100) and only main viewer (user of the electronic device (100)) can view confidential object(s).

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for securing display of confidential content by an electronic device comprising a screen and at least one processor, the method comprising:
    displaying, by the electronic device, content on the screen of the electronic device;
    detecting, by the electronic device, an event to initiate a secure mode in the electronic device, wherein the event comprises a folding of the electronic device;
    initiating, by the electronic device, the secure mode for the electronic device based on the detected event;
    determining, by the electronic device, confidential portions and non-confidential portions of the content displayed on the screen of the electronic device including:
        determining, by the electronic device, a view priority score of the content displayed on the screen of the electronic device in response to the secure mode being initiated, and
        modifying, by the electronic device, a display characteristic of the content displayed on the screen of the electronic device based on the view priority score,
    wherein the confidential portions and the non-confidential portions of the content displayed on the screen of the electronic device are based on a confidentiality score of the content displayed on the screen, and the confidentiality score of the content is for identifying the confidential portions and the non-confidential portions of the content displayed on the screen of the electronic device;
    determining, by the electronic device, at least one of: a viewing angle of a user of the electronic device or a viewing distance of the user of the electronic device; and
    displaying, by the electronic device, the confidential portions of the content in a manner based on the at least one of: the viewing angle of the user of the electronic device or the viewing distance of the user of the electronic device, and
    wherein the initiating the secure mode comprises dividing the screen into a first area and a second area based on a folding line corresponding to the folding of the electronic device,
    wherein the displaying the confidential portions of the content comprises:
        dividing the confidential portions of the content into a plurality of slices,
        displaying a portion of the plurality of slices on the first area of the screen, and
        displaying a remaining of the plurality of slices on the second area of the screen.

2. The method as claimed in claim 1, wherein the secure mode is initiated by the folding of the electronic device, and wherein the method comprises:
    determining, by the electronic device, whether a folding angle meets a folding threshold; and
    initiating, by the electronic device, the secure mode in the electronic device in response to determining that the folding angle meets the folding threshold.

3. The method as claimed in claim 2, wherein the folding angle of the electronic device is determined at least by:
    receiving, by the electronic device, data from a plurality of sensors of the electronic device; and
    determining, by the electronic device, the folding angle of the electronic device based on at least the received data.

4. The method as claimed in claim 3, wherein the data from the plurality of sensors of the electronic device comprises data indicating a directional movement of the electronic device, an orientation or a tilt during the directional movement of the electronic device, magnetic data of the electronic device, and vibrational data of the electronic device, and wherein the plurality of sensors of the electronic device comprise a gyroscope sensor, an accelerometer sensor, a magnetometer sensor, and a vibration sensor.

5. The method as claimed in claim 1, wherein the modifying, by the electronic device, the display characteristic of the content displayed on the screen of the electronic device based on the view priority score comprises:
    assigning, by the electronic device, the view priority score to the content displayed on the screen of the electronic device based on a view z-order, a view size, and a size of the electronic device, wherein the content comprises at least one of a surface view, a text view, a video view, an image view, a button, or a checkbox; and
    configuring, by the electronic device, a color intensity of the content displayed on the screen of the electronic device based on the assigned view priority score, wherein the assigned view priority score comprises at least one of a high priority score has a greater reflective characteristic or a low priority score has a lesser reflective characteristic.

6. The method as claimed in claim 1, wherein determining, by the electronic device, the confidentiality score of the content displayed on the screen of the electronic device comprises:

extracting, by the electronic device, a plurality of objects from the displayed content, wherein the plurality of objects comprises at least one of: an image object, a text object, or a button object;

generating, by the electronic device, an array of each object of the plurality of objects;

resizing, by the electronic device, each object of the plurality of objects and a layout of the screen at least by passing the generated array into a framework of the electronic device;

determining, by the electronic device, at least one actionable item from the plurality of objects, wherein the at least one actionable item comprises a clickable button and a non-clickable button;

generating, by the electronic device, the confidentiality score of the content displayed on the screen of the electronic device based on applying at least one Machine Learning (ML) model on the at least one actionable item, the resized each object, the resized layout or a configured color intensity; and classifying, by the electronic device, the content based on the confidentiality score to identify the confidential portions and the nonconfidential portions of the content displayed on the screen of the electronic device.

7. The method as claimed in claim 6, wherein the array comprises at least one of: an object Identity (ID), a location of the object on the screen of the electronic device, a size of the object, an alignment of the object on the screen of the electronic device, or a position of the object on the screen of the electronic device.

8. The method as claimed in claim 6, wherein each object and the layout is resized based on reflection points, a reflection area, a folding angle, the viewing angle of the user of electronic device, and an angle of reflection.

9. The method as claimed in claim 8, wherein the reflection points and the reflection area are identified based on the folding angle, the viewing distance of the user of electronic device, the viewing angle of the user of electronic device, and the angle of reflection.

10. The method as claimed in claim 1, wherein the displaying, by the electronic device, the confidential portions of the content based on the at least one of the viewing angle of the user of the electronic device or the viewing distance of the user of the electronic device comprises:

splitting, by the electronic device, the confidential portions and the non-confidential portions of the content displayed on the screen of the electronic device based on a confidentiality score in order to display the confidential portions and the non-confidential portions of the content at optimal places on the screen of the electronic device.

11. The method as claimed in claim 10, wherein the splitting, by the electronic device, of the confidential portions and the non-confidential portions of the content displayed on the screen of the electronic device in order to place the confidential portions and the non-confidential portions of the content at optimal places on the screen of the electronic device comprises:

splitting, by the electronic device, the confidential portions and the non-confidential portions of the content displayed on the screen of the electronic device;

modifying, by the electronic device, the confidential portions of the content displayed on the screen of the electronic device by performing at least one action; and placing, by the electronic device, the confidential portions of the content displayed on the screen of the electronic device based on at least one of the folding angle, the viewing distance of the user of the electronic device, the viewing angle of the user of the electronic device, an angle of reflection, reflection points or a reflection area.

12. The method as claimed in claim 1, wherein the displaying the confidential portions of the content is in a manner based on the viewing distance of the user of the electronic device, and wherein the viewing distance of the user of the electronic device is determined by at least:

capturing, by a front camera of the electronic device, an image on the screen of the electronic device, wherein the image comprises a face of the user of the electronic device and is generated on the screen of the electronic device by a reflective characteristic and the displayed content on the screen of the electronic device;

extracting, by the electronic device, at least part of the face of the user of the electronic device by removing the displayed content from the captured image;

determining, by the electronic device, at least one of a first dimension of the extracted at least part of the face of the user of the electronic device using the front camera of the electronic device or a second dimension of the extracted at least part of the face of the user of the electronic device formed on the screen of the electronic device by the reflective characteristic;

determining, by the electronic device, a first distance between the extracted at least part of the face of the user of the electronic device formed on the screen of the electronic device and the front camera of the electronic device; and determining, by the electronic device, the distance of the user of the electronic device from the electronic device based on at least one of the first dimension, the second dimension, or the first distance.

13. The method as claimed in claim 1, comprising:

determining, by the electronic device, the viewing angle of the user of the electronic device and an angle of reflection based on at least one of a folding angle, a dimension of the electronic device, or a second dimension of an extracted face of the user of the electronic device.

14. An electronic device for securing display of confidential content, the electronic device comprising:

a memory;

a processor; and a content controller, operably connected to the memory and the processor, configured to:

display content on a screen of the electronic device;

detect an event to initiate a secure mode in the electronic device, wherein the event comprises a folding of the electronic device;

initiate the secure mode for the electronic device based on the detected event;

determine confidential portions and non-confidential portions of the content displayed on the screen of the electronic device including:

determine a view priority score of the content displayed on the screen of the electronic device when the secure mode is initiated, and modify a display characteristic of the content displayed on the screen of the electronic device based on the view priority score, wherein the confidential portions and the non-confidential portions of the content displayed on the screen of the electronic device are based on a confidentiality score of the content displayed on the screen, and the confidentiality score of the content is for identifying the confidential portions and the non-confidential portions of the content displayed on the screen;

determine at least one of a viewing angle of a user of the electronic device or a viewing distance of the user of the electronic device; and display the confidential portions of the content based on the at least one of the viewing angle of the user of the electronic device or the viewing distance of the user of the electronic device, wherein the processor further is configured to:

initiate the secure mode by dividing the screen into a first area and a second area based on a folding line corresponding to the folding of the electronic device, divide the confidential portions of the content into a plurality of slices, display a portion of the plurality of slices on the first area of the screen, and display a remaining of the plurality of slices on the second area of the screen.

15. The electronic device as claimed in claim 14, wherein the secure mode is initiated by the folding of the electronic device comprises:

determine whether a folding angle meets a folding threshold; and initiate the secure mode in the electronic device in response to determining that the folding angle meets the folding threshold.

16. The electronic device as claimed in claim 15, wherein the folding angle of the electronic device is determined by:

receive data from a plurality of sensors of the electronic device; and determine the folding angle of the electronic device based on the received data.

17. The electronic device as claimed in claim 16, wherein the data comprises a directional movement of the electronic device, an orientation or a tilt during the directional movement of the electronic device, magnetic data of the electronic device, and vibrational data of the electronic device, and wherein the plurality of sensors of the electronic device comprises a gyroscope sensor, an accelerometer sensor, a magnetometer sensor, and a vibration sensor.

* * * * *